US011165538B2

(12) United States Patent
Gulati et al.

(10) Patent No.: US 11,165,538 B2
(45) Date of Patent: Nov. 2, 2021

(54) CODEBLOCK CONCATENATION FOR IMPROVED VULNERABLE SYMBOL HANDLING

(71) Applicant: QUALCOMM Incorporated, San Diego, CA (US)

(72) Inventors: Kapil Gulati, Hillsborough, NJ (US); Shuanshuan Wu, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 4 days.

(21) Appl. No.: 16/865,144

(22) Filed: May 1, 2020

(65) Prior Publication Data

US 2020/0351018 A1    Nov. 5, 2020

Related U.S. Application Data

(60) Provisional application No. 62/843,057, filed on May 3, 2019.

(51) Int. Cl.
*H04L 1/00* (2006.01)
*H04W 72/04* (2009.01)

(52) U.S. Cl.
CPC .......... *H04L 1/0064* (2013.01); *H04W 72/04* (2013.01)

(58) Field of Classification Search
CPC ... H04L 1/0009; H04L 1/0041; H04L 1/0013; H04L 5/0007; H04L 27/20; H04L 5/0044;
(Continued)

(56) References Cited

U.S. PATENT DOCUMENTS

2008/0177895 A1* 7/2008 Laprade ................ H04L 1/0055
709/236
2008/0229171 A1* 9/2008 Laprade ............ H03M 13/3707
714/755
(Continued)

FOREIGN PATENT DOCUMENTS

WO    2018183924 A1    10/2018
WO    2018222312 A1    12/2018

OTHER PUBLICATIONS

International Search Report and Written Opinion—PCT/US2020/031229—ISA/EPO—dated Aug. 18, 2020.
(Continued)

*Primary Examiner* — Jung Liu
(74) *Attorney, Agent, or Firm* — Arent Fox LLP

(57) ABSTRACT

The present implementations relate to codeblock concatenation for improved vulnerable symbol handling. For example, a transmitter user equipment (UE) may, for each of the first codeblock and the second codeblock, a first number of coded bits to be mapped to the first number of resource elements satisfying a vulnerability condition and the second number of resource elements not satisfying a vulnerability condition. The UE further extracts, for each of the first codeblock and the second codeblock, a subset of the first number of coded bits and a subset of the second number of coded bits. The UE further concatenates the subset of the first and second number of coded bits from the first codeblock and the second codeblock, and generates a concatenated codeblock for transmission including the concatenated subset of the first number of coded bits and the concatenated subset of the second number of coded bits.

30 Claims, 17 Drawing Sheets

(58) Field of Classification Search
CPC ... H04L 1/0025; H04L 1/0029; H04L 1/0003; H04L 5/0046; H04L 1/0064; H04L 5/0058; H04L 1/1893; H04L 1/0067; H04L 1/0078; H04L 1/0058; H04L 5/003; H04L 1/0042; H04L 5/0053; H04L 1/007; H04L 27/34; H04L 5/001; H04L 5/0055; H04L 5/0057; H04L 1/0071; H04L 1/0065; H04L 1/0066; H04W 72/04; H03M 13/296; H03M 13/2703; H03M 13/6561; H03M 13/2735; H03M 13/271; H03M 13/2771

See application file for complete search history.

(56) References Cited

U.S. PATENT DOCUMENTS

| | | | | |
|---|---|---|---|---|
| 2010/0031122 | A1* | 2/2010 | Laprade | H03M 13/2775 |
| | | | | 714/763 |
| 2010/0260161 | A1* | 10/2010 | Van Veen | H03M 13/296 |
| | | | | 370/342 |
| 2013/0132796 | A1* | 5/2013 | Vummintala | H03M 13/29 |
| | | | | 714/758 |
| 2015/0326341 | A1* | 11/2015 | Hernando | H04L 5/0044 |
| | | | | 370/328 |
| 2015/0358111 | A1* | 12/2015 | Marinier | H04L 1/0026 |
| | | | | 370/329 |
| 2019/0044669 | A1* | 2/2019 | Davydov | H04L 5/005 |
| 2020/0067651 | A1* | 2/2020 | Takeda | H04L 1/0003 |
| 2020/0112398 | A1* | 4/2020 | Takeda | H04L 5/0055 |

OTHER PUBLICATIONS

Qualcomm Incorporated: "Considerations on Physical Layer Aspects of NR V2X," 3GPP Draft, 3GPP TSG RAN WG1 Meeting #96, R1-1902994_NR V2X Physical Layer Structures, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 25, 2019-Mar. 1, 2019, Feb. 16, 2019 (Feb. 16, 2019), XP051600691, 18 pages.

* cited by examiner

CODEBLOCK CONCATENATION FOR IMPROVED VULNERABLE SYMBOL HANDLING

CROSS-REFERENCE TO RELATED APPLICATION(S)

This application claims the benefit of U.S. Provisional Application Ser. No. 62/843,057, entitled "CODEBLOCK CONCATENATION FOR IMPROVED VULNERABLE SYMBOL HANDLING" and filed on May 3, 2019, which is expressly incorporated by reference herein in its entirety.

BACKGROUND

The present disclosure relates generally to communication systems, and more particularly, to vehicle-to-vehicle (V2V), vehicle-to-everything (V2X), or other device-to-device (D2D) communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. Aspects of wireless communication may comprise direct communication between devices, such as in V2X, V2V, and/or D2D communication. There exists a need for further improvements in V2X, V2V, and/or D2D technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method for wireless communication may include determine, for each of a first codeblock and a second codeblock, a first number of resource elements satisfying a vulnerability condition and a second number of resource elements not satisfying the vulnerability condition. The method may further include determining, for each of the first codeblock and the second codeblock, a first number of coded bits to be mapped to the first number of resource elements and the second number of resource elements. The method may further include extracting, for each of the first codeblock and the second codeblock, a subset of the first number of coded bits and a subset of the second number of coded bits. The method may further include concatenating the subset of the first number of coded bits from the first codeblock and the second codeblock. The method may further include concatenating the subset of the second number of coded bits from the first codeblock and the second codeblock. The method may further include generating a concatenated codeblock for transmission including the concatenated subset of the first number of coded bits and the concatenated subset of the second number of coded bits.

In a further aspect, the present disclosure includes an apparatus for wireless communication including a memory and at least one processor coupled to the memory. The at least one processor may be configured to determine, for each of a first codeblock and a second codeblock, a first number of resource elements satisfying a vulnerability condition and a second number of resource elements not satisfying the vulnerability condition. The at least one processor may further be configured to determine, for each of the first codeblock and the second codeblock, a first number of coded bits to be mapped to the first number of resource elements and the second number of resource elements. The at least one processor may further be configured to extract, for each of the first codeblock and the second codeblock, a subset of the first number of coded bits and a subset of the second number of coded bits. The at least one processor may further be configured to concatenate the subset of the first number of coded bits from the first codeblock and the second codeblock. The at least one processor may further be configured to concatenate the subset of the second number of coded bits from the first codeblock and the second codeblock. The at least one processor may further be configured to generate a concatenated codeblock for transmission including the concatenated subset of the first number of coded bits and the concatenated subset of the second number of coded bits.

In an additional aspect, the present disclosure includes an apparatus for wireless communication including means for determining, for each of a first codeblock and a second codeblock, a first number of resource elements satisfying a vulnerability condition and a second number of resource elements not satisfying the vulnerability condition. The apparatus may further include means for determining, for each of the first codeblock and the second codeblock, a first number of coded bits to be mapped to the first number of resource elements and the second number of resource elements. The apparatus may further include means for extracting, for each of the first codeblock and the second codeblock, a subset of the first number of coded bits and a subset of the second number of coded bits. The apparatus may further include means for concatenating the subset of the first number of coded bits from the first codeblock and the second codeblock. The apparatus may further include means for concatenating the subset of the second number of coded bits from the first codeblock and the second codeblock. The apparatus may further include means for generating a concatenated codeblock for transmission including the concatenated subset of the first number of coded bits and the concatenated subset of the second number of coded bits.

In yet another aspect, the present disclosure includes a computer-readable medium storing computer executable code, the code when executed by a processor cause the processor to determine, for each of a first codeblock and a second codeblock, a first number of resource elements satisfying a vulnerability condition and a second number of resource elements not satisfying the vulnerability condition, determine, for each of the first codeblock and the second codeblock, a first number of coded bits to be mapped to the first number of resource elements and the second number of resource elements, extract, for each of the first codeblock and the second codeblock, a subset of the first number of coded bits and a subset of the second number of coded bits, concatenate the subset of the first number of coded bits from the first codeblock and the second codeblock, concatenate the subset of the second number of coded bits from the first codeblock and the second codeblock, and generate a concatenated codeblock for transmission including the concatenated subset of the first number of coded bits and the concatenated subset of the second number of coded bits.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
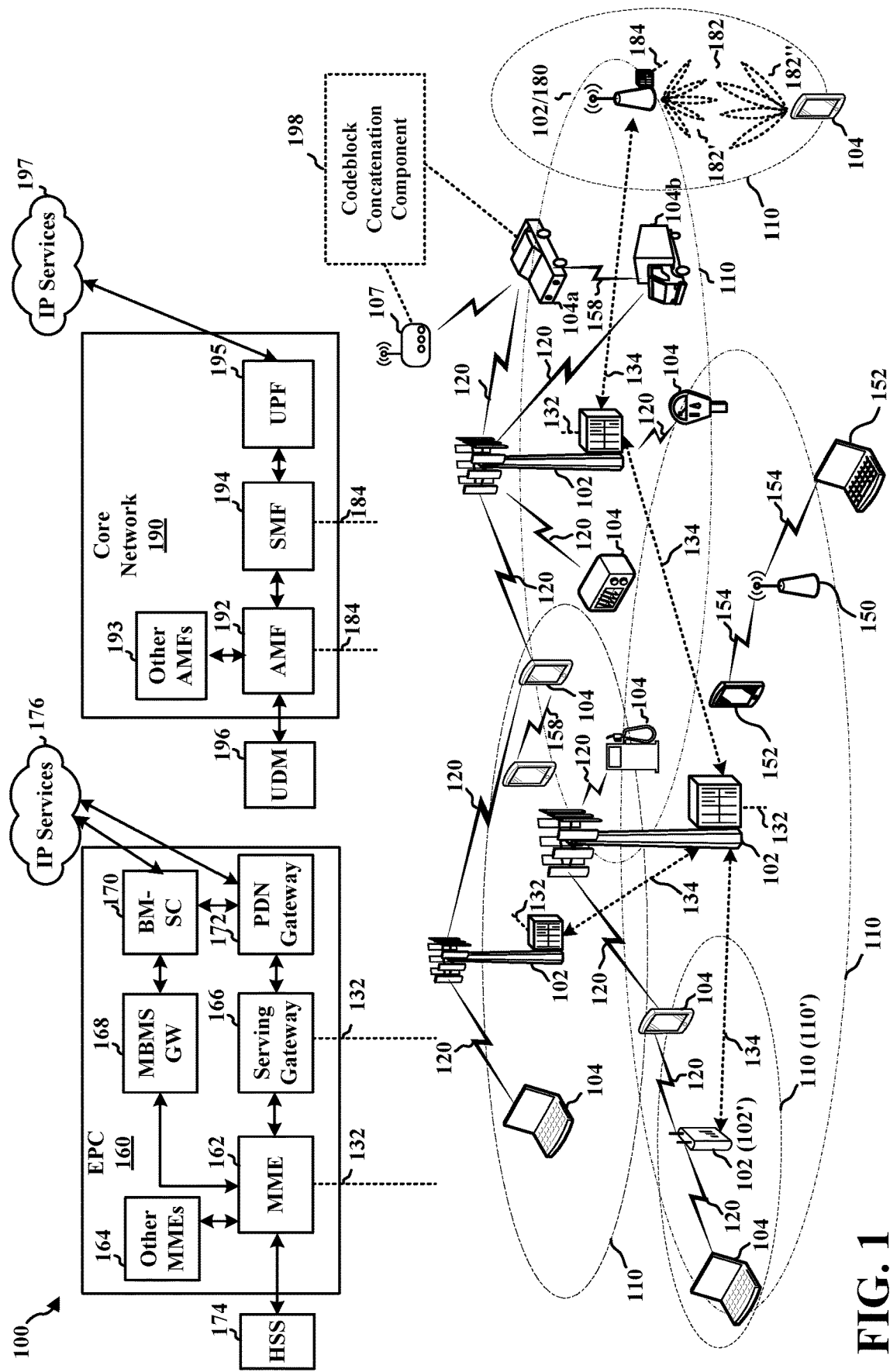
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The present implementations generally relates to codeblock concatenation for improved vulnerable symbol handling. In some wireless communication systems, such as, but not limited to, device-to-device (D2D) and/or vehicle-to-everything (V2X) systems, transmissions of data by a user equipment (UE) may inevitably include vulnerable symbols that result in catastrophic errors. Vulnerable symbols may be defined as symbols that can potentially be lost at a receiver due to various factors. For example, such factors include automatic gain control (AGC) retraining, transmission/reception retuning, and/or half duplex constraints (e.g., receiver UE may transmit acknowledgment or negative acknowledgment (ACK/NACK) on a symbol). At the receiver, any vulnerable resource element that is punctured may be handled by setting the log likelihood ratios (LLRs) corresponding to that symbol equal to zero.

As previously noted, puncturing symbols at the receiver may lead to catastrophic errors (e.g., blind error rate (BLER) =1 at all signal-to-noise (SNRs)) or significant performance degradation. The best case scenario, when puncturing occurs, may be performance loss proportional to a value equal to a number of punctured resource elements divided by a number of total resource elements. In some cases, however, catastrophic error or significant performance degradation may be possible (depending on coding, resource element mapping etc.). For instance, for some implementations of V2X, the first symbol may get punctured at the receiver for the purpose of AGC retraining. The forgoing may be indicative of transport block size (TBS) and/or modulation and coding scheme (MCS) combinations that may lead to catastrophic errors due to the same. As such, the aforementioned is a fundamental problem to be solved for D2D/V2V scenarios. Specifically, it may be desirable to implement a low-complexity retransmission scheme for improved handling of vulnerable symbols to provide robustness to potential symbol puncturing at the receiver.

As such, the present implementations provide techniques for codeblock concatenation for improved vulnerable symbol handling. Specifically, in an implication, a transmitter UE may determine, for each of a first codeblock and a second codeblock, a first number of resource elements satisfying a vulnerability condition and a second number of resource elements not satisfying the vulnerability condition. The UE may further determine, for each of the first codeblock and the second codeblock, a first number of coded bits to be mapped to the first number of resource elements and the second number of resource elements. The UE may further extract, for each of the first codeblock and the second codeblock, a subset of the first number of resource elements and a subset of the second number of resource elements. The UE may further concatenate the subset of the first number of resource elements from the first codeblock and the second codeblock. The UE may further concatenate the subset of the second number of resource elements from the first codeblock and the second codeblock. The UE may further generate a concatenated codeblock for transmission including the concatenated subset of the first number of resource elements and the concatenated subset of the second number of resource elements.

Additional features of the present aspects are described in more detail below with respect to FIGS. 1-17.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

In certain aspects, a UE 104a, e.g., a transmitting Vehicle User Equipment (VUE) or other UE, may be configured to transmit messages directly to another UE 104, e.g., UE 104b. The communication may be based on V2V/V2X or other D2D communication, such as Proximity Services (ProSe). Communication based on V2V, V2X, and/or D2D may also be transmitted and received by other transmitting and receiving devices, such as Road Side Unit (RSU) 107, etc. Aspects of the communication may be based on PC5 or sidelink communication.

In certain aspects, a UE 104a (e.g., a transmitting device) may comprise a codeblock concatenations component 198 configured to determine, for each of a first codeblock and a second codeblock, a first number of resource elements satisfying a vulnerability condition and a second number of resource elements not satisfying the vulnerability condition. The codeblock concatenations component 198 may determine, for each of the first codeblock and the second codeblock, a first number of coded bits to be mapped to the first number of resource elements and the second number of resource elements. The codeblock concatenations component 198 may extract, for each of the first codeblock and the second codeblock, a subset of the first number of resource elements and a subset of the second number of resource elements. The codeblock concatenations component 198 may concatenate the subset of the first number of resource elements from the first codeblock and the second codeblock. The apparatus may concatenate the subset of the second number of resource elements from the first codeblock and the second codeblock. The codeblock concatenations component 198 may generate a concatenated codeblock for transmission including the concatenated subset of the first number of resource elements and the concatenated subset of the second number of resource elements.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
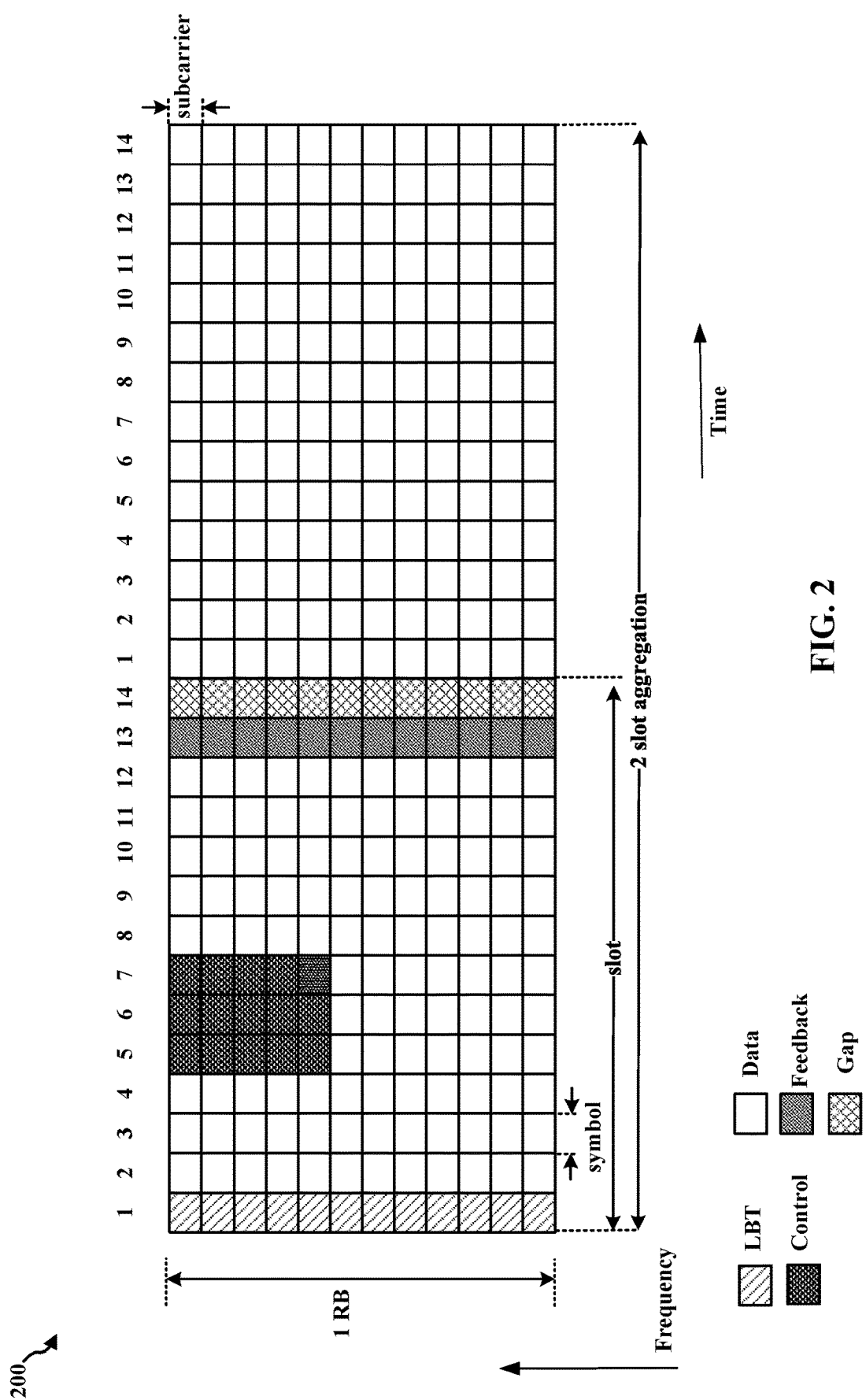
FIG. 2 illustrates an example of a sidelink slot structure.

FIG. 2 is a diagram 200 illustrating an example of a slot structure that may be used within a 5G/NR frame structure, e.g., for sidelink communication. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information, e.g., along with demodulation RS (DM-RS). The control information may comprise Sidelink Control Information (SCI). At least one symbol at the beginning of a slot may be used by a transmitting device to perform a Listen Before Talk (LBT) operation prior to transmitting. At least one symbol may be used for feedback, as described herein. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 2. Multiple slots may be aggregated together. FIG. 2 illustrates an example aggregation of two slot. The aggregated number of slots may also be larger than two. When slots are aggregated, the symbols used for feedback and/or a gap symbol may be different that for a single slot.

Figure 3:
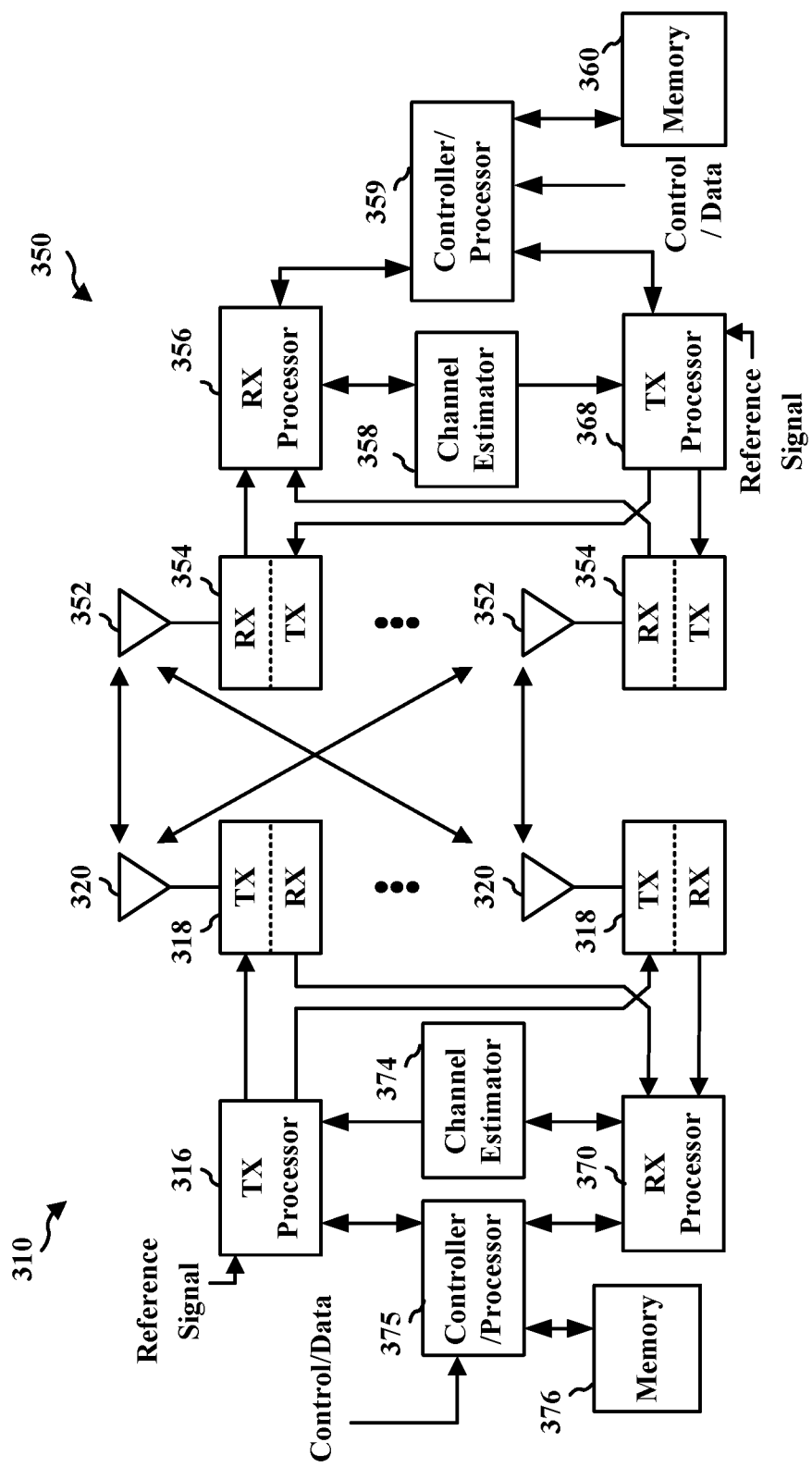
FIG. 3 is a diagram illustrating an example of a first device and a second device involved in wireless communication based, e.g., on V2V, V2X, and/or device-to-device communication.

FIG. 3 is a block diagram 300 of a first wireless communication device 310 in communication with a second wireless communication device 350, e.g., via V2V/V2X/D2D communication. The device 310 may comprise a transmitting device including, for example, codeblock concatenations component 198, communicating with a receiving device, e.g., device 350, via V2V/V2X/D2D communication. The communication may be based, e.g., on sidelink. The transmitting device 310 may comprise a UE, an RSU, etc. The receiving device may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

Figure 4:
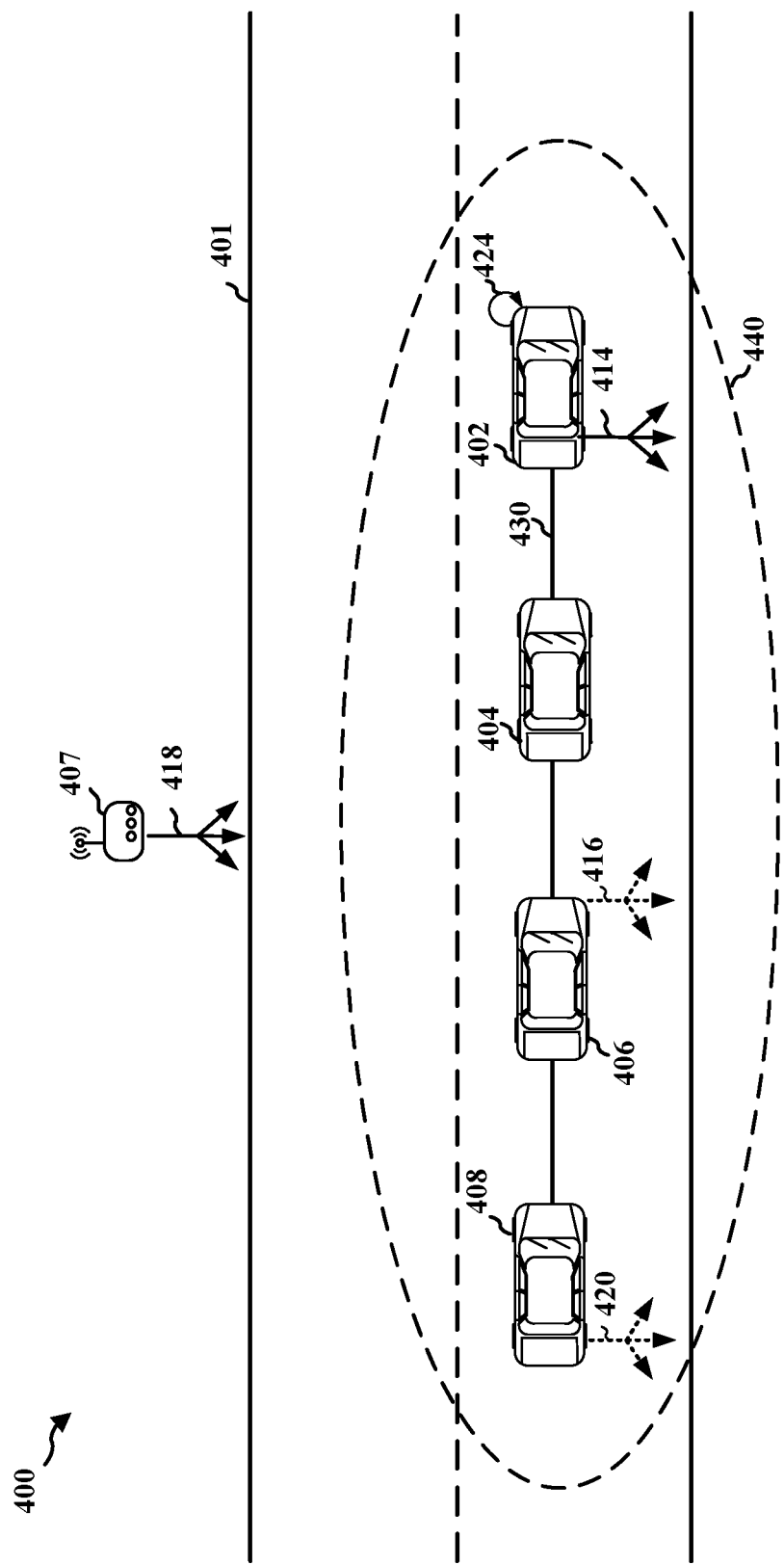
FIG. 4 is a diagram illustrating an example of vehicle platooning according to one or more implementations of the present disclosure.

FIG. 4 illustrates an example 400 of wireless communication between devices based on V2X/V2V/D2D communication. Transmitting device 402, which may include code-block concatenation component 198, transmits a transmission 414, e.g., comprising a control channel and/or a corresponding data channel, that may be received by receiving devices 404, 406, and 408. The devices 402, 404, 406, and 408 may each be capable of operating as a transmitting device in addition to operating as a receiving device. In particular, the receiving devices 404, 406, and 408 may transmit positive acknowledgments of the transmission 414. Thus, device 406 is illustrated as transmitting a transmission 420 and device 408 is illustrated as transmitting a transmission 420. Device 404 is illustrated with no transmission, which may signify that the device 404 did not receive or correctly decode the transmission 414. The transmissions 414, 416, and 420 may be broadcast or multicast to nearby devices. In addition to receiving devices 404, 406, and 408, the transmitting device 402 may also transmit or receive communication from RSU 407 and other devices.

Figure 5:
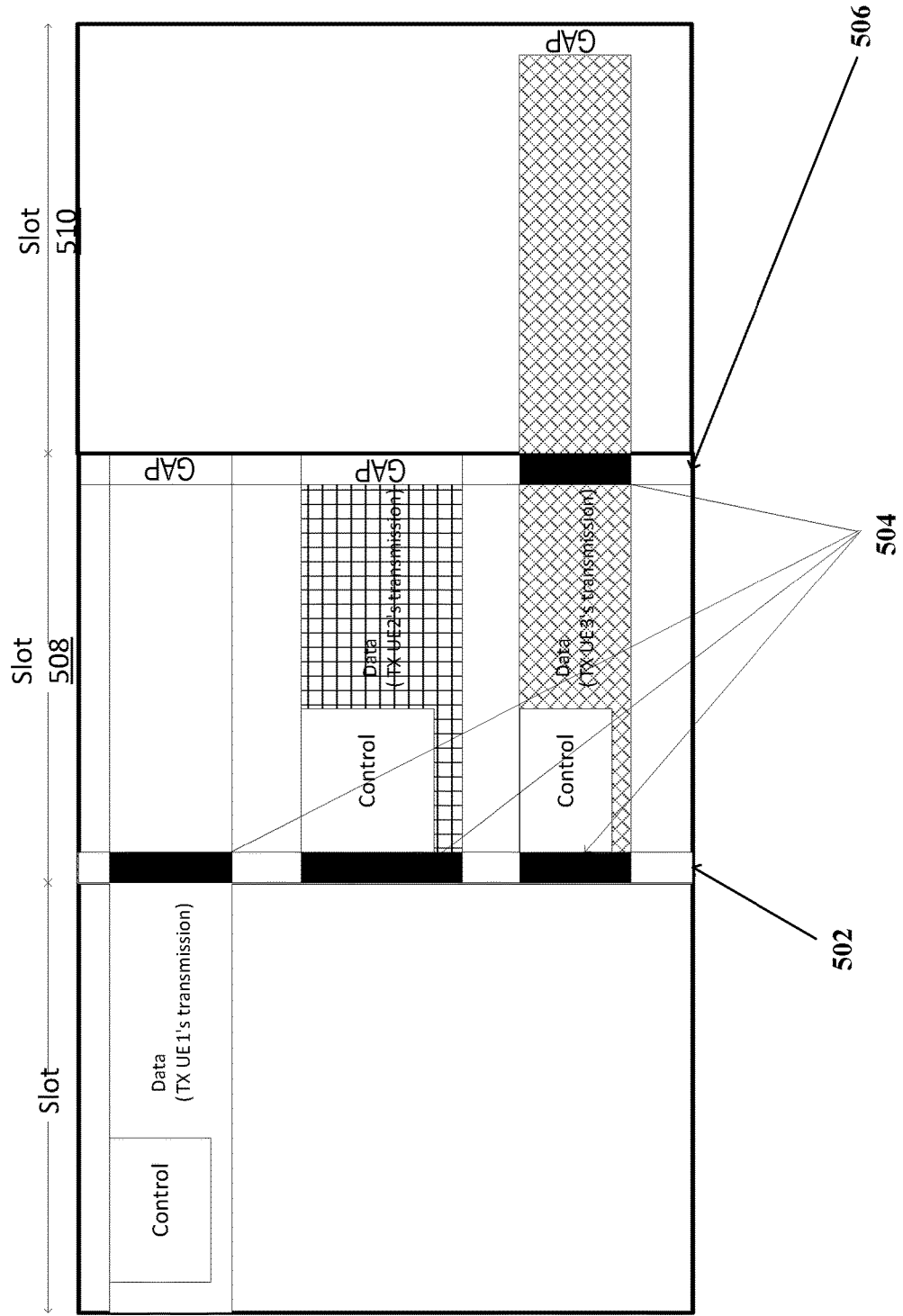
FIG. 5 is an example diagram of vulnerable symbol puncturing according to one or more implementations of the present disclosure.

FIG. 5 is an example diagram 500 of vulnerable symbol puncturing. For example, the symbol puncturing may be experienced at a receiver side. The symbol puncturing may be due to, at least in part, AGC retraining. At 502, for instance, a second transmitter UE (e.g., which may be in proximity to the receiver UE), may begin transmission in slot 508, resulting in low noise amplifier (LNA) saturation at the receiver UE. The receiver UE may lose a first symbol as a result of AGC retraining and/or LNA gain setting based on a newly received power level in the same slot. At 504, the lost or punctured symbols are shown corresponding to the respective transmission at the receiver UE. At 506, the second transmitter UE (e.g., which may be in close proximity to the receiver UE), may stop transmission in the slot 508, resulting in a much lower receiver power in slot 510. AGC may be implemented to reduce quantization noise when the receiver UE is receiving second transmitter UE's transmission.

In some implementations, opportunistic use of the vulnerable symbols may be avoided initially. That is, potentially vulnerable are rate matched at the transmitter. For example, in the case where the vulnerable symbol may be due to AGC, the AGC symbol can then be a special sequence for AGC purposes only. However, the above implementation may result in loss with respect to spectral efficiency and/or throughput and range. The loss may depend on a subcarrier spacing (SCS) and other transmission parameters (e.g., total number of resource elements for data bits).

In another implementation, a mapping of the coded bits with higher importance (e.g., systematic bits) to resource elements that are vulnerable to receiver puncturing may be avoided. To do so, changes to the bit interleaver, virtual resource block (VRB) mapping, and/or codeblock concatenation may be performed. An advantage of this implementation may be significant performance gains, while preserving certain implementation friendly aspects. However, the drawbacks may include hardware and firmware changes, that may be different from NR Uu baseline implementations.

Figure 6:
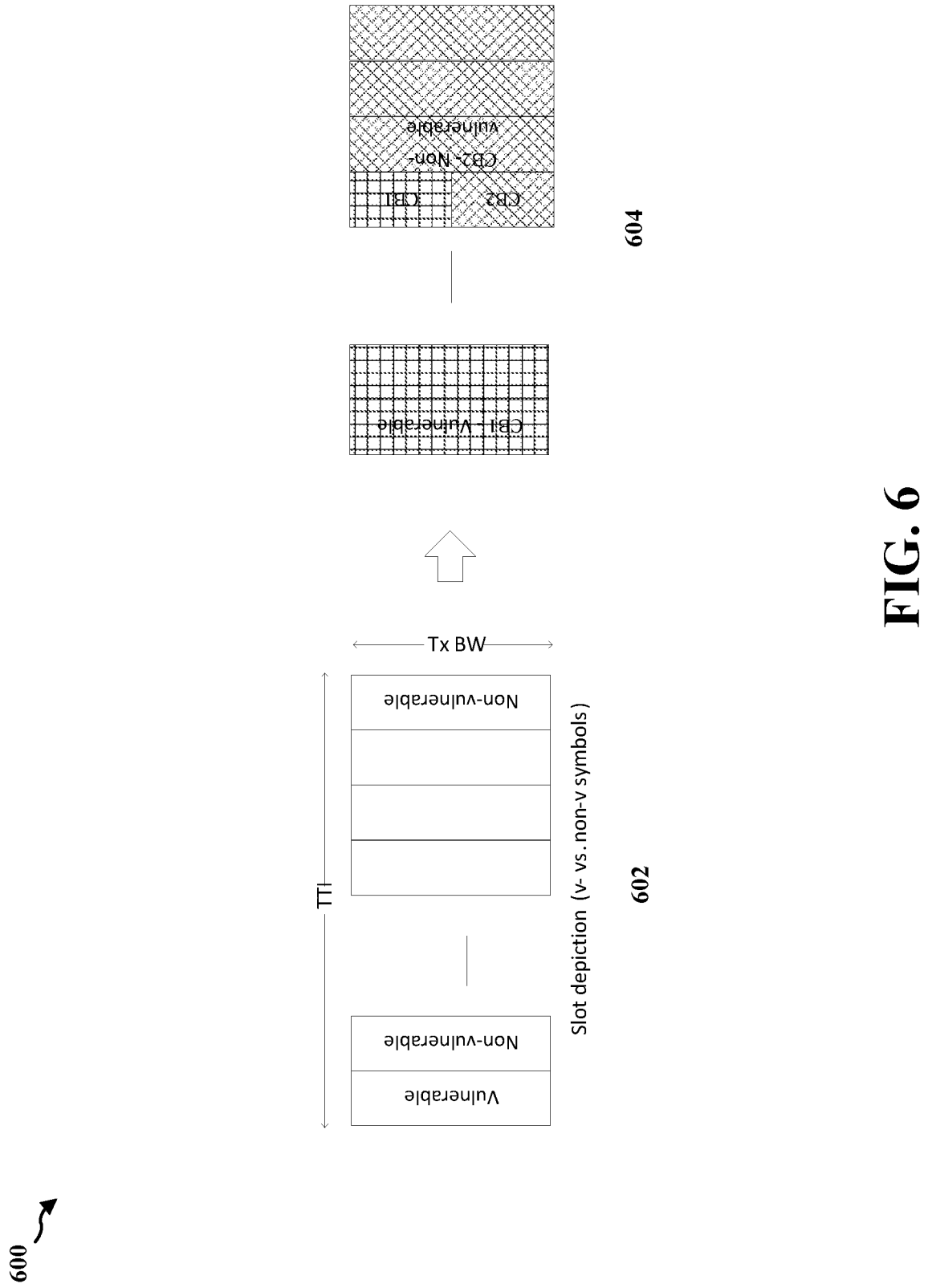
FIG. 6 is an example conceptual diagram of slot transmission with two codeblocks according to one or more implementations of the present disclosure.

In a further aspect, sub-optimal implementations of the mapping of coded bits with higher importance to resource elements that are vulnerable to receiver puncturing may be performed. That is, attempts to reuse NR Uu baseline coding and resource element mapping procedures may be made, with minimal modifications to achieve good performance/complexity tradeoffs. In this implementation, changes to codeblock concatenation may be made. Hence, this implementation provides a sub-optimal scheme that permutes the order of codeblocks over retransmission (e.g., for improved performance with retransmissions). The present implementations differ from the above examples, however, by providing alternate codeblock concatenation procedures that does not rely on retransmission for improved performance FIG. 6 is an example conceptual diagram 600 of slot transmission with two codeblocks. In some implementations, NR Uu baseline coding and VRB mapping may lead to unequal codeblock protection of vulnerable symbols. For instance, as shown in diagram 600, a slot transmission with two codeblocks in a transport block demonstrates the unequal codeblock protection. Specifically, slot depiction 602 shows the vulnerable symbols and non-vulnerable symbols within a transmit time interval (TTI). The coded and mapped symbols of 604 demonstrates that all the puncturing occurs in a first codeblock, while the second codeblock is not punctured. As shown in 604, only the first codeblock is mapped to vulnerable symbols. As a result, the first codeblock may have degraded performance compared to the second codeblock.

Figure 7:
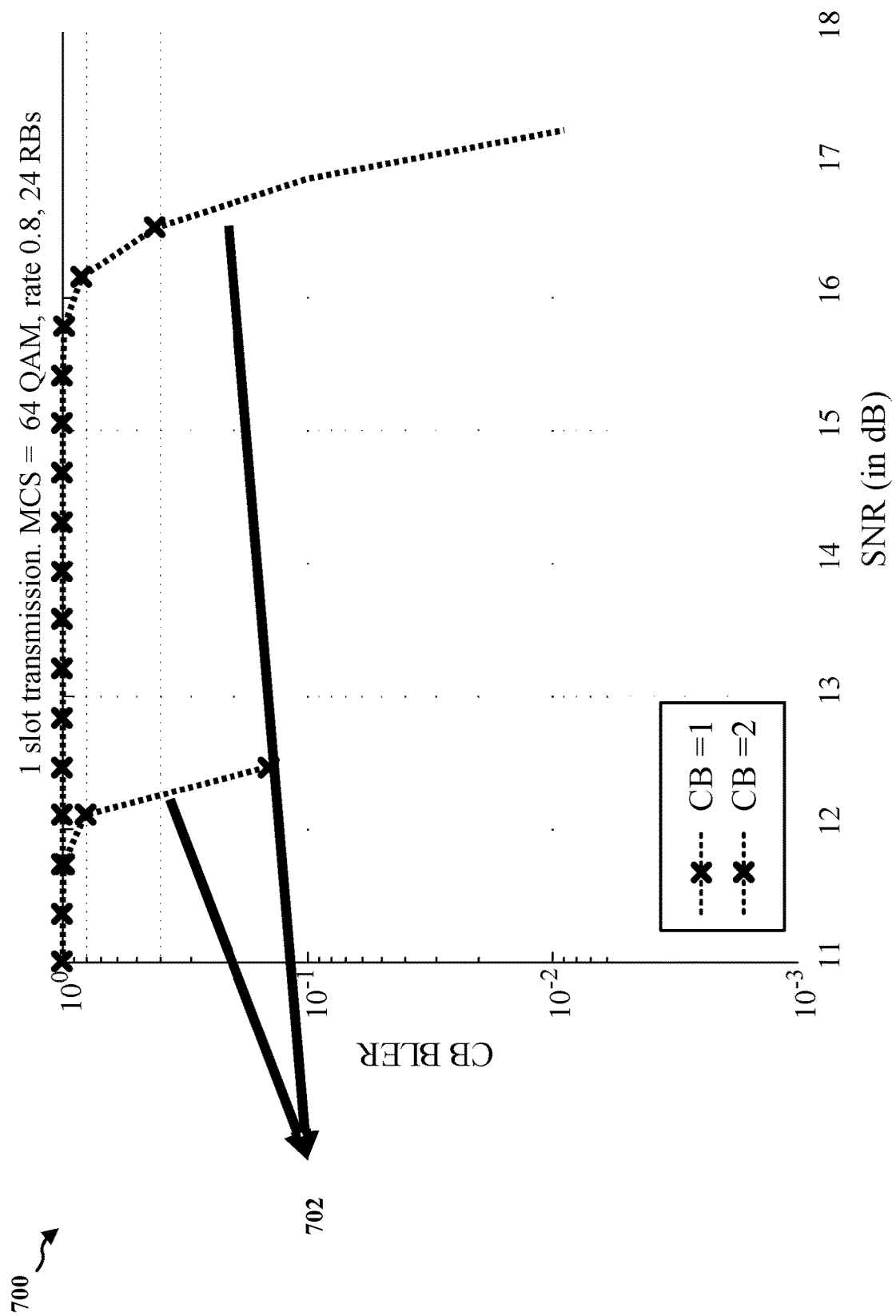
FIG. 7 is a graph diagram of an example signal-to-noise ratio mapped to the blind error rate according to one or more implementations of the present disclosure.

FIG. 7 is a graph diagram 700 of the signal-to-noise ratio (SNR) mapped to the blind error rate (BLER) for codeblock transmissions. Specifically, points 702 demonstrate that without improved concatenation of vulnerable symbols, the codeblocks may be disproportionally protected due to receiver side puncturing of the vulnerable symbols. The result may be an increased SNR and/or BLER for codeblock 1, increasing the likelihood of performance degradation at a receiver UE.

Figure 8:
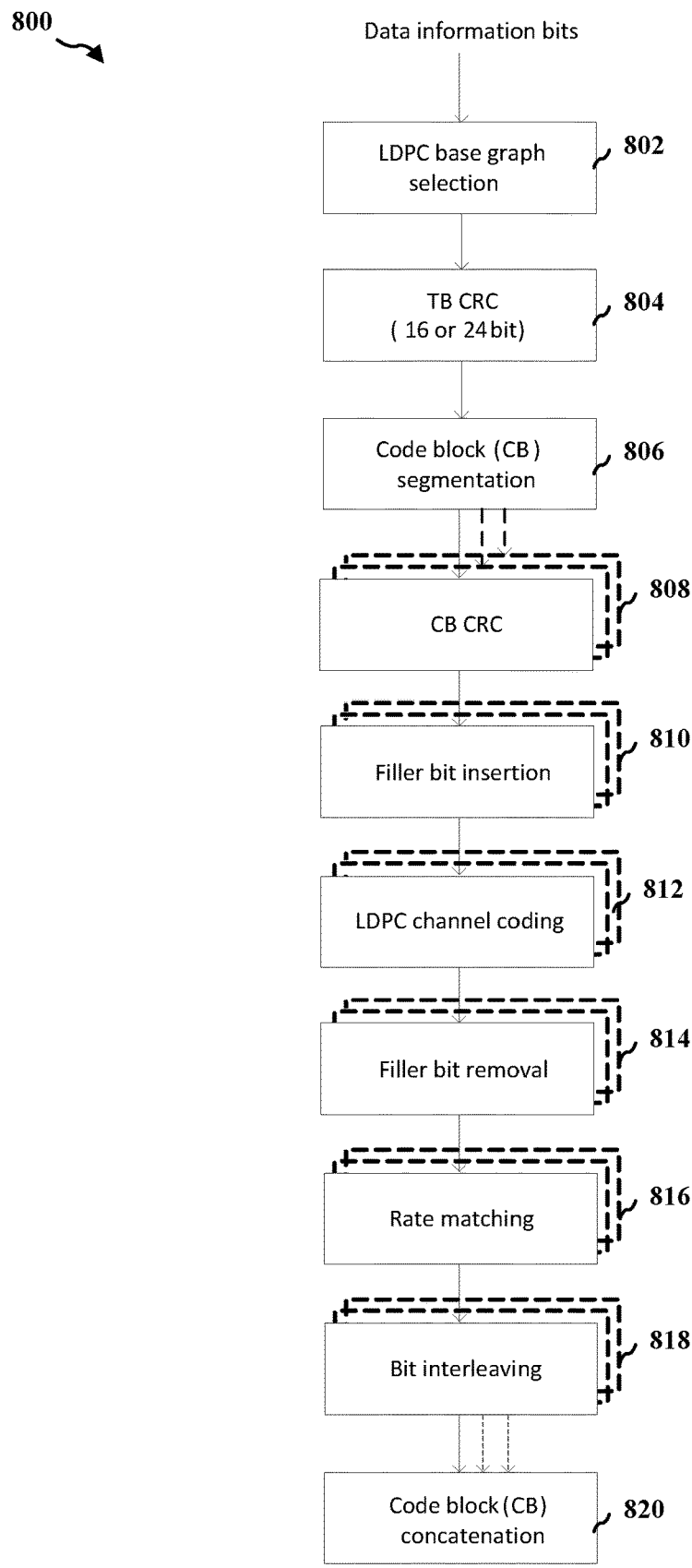
FIG. 8 is a flow diagram of an example coding scheme according to one or more implementations of the present disclosure.

FIG. 8 is a flow diagram of a coding scheme 800 according to one or more implementations of the present disclosure. At 802, coding scheme 800 may include receiving data information bits may be and performing low density parity check (LDPC) base graph selection. At 804, coding scheme 800 may include a TB cyclic redundancy check (CRC) of 16 or 24 bit. At 806, coding scheme 800 may include a CB segmentation. At 808, coding scheme 800 may perform codeblock CRC. At 810, coding scheme 800 may include a filler bit insertion. At 812, coding scheme 800 may include LDPC channel coding. At 814, coding scheme 800 may include filler bit removal. At 816, coding scheme 800 may include rate matching. At 818, coding scheme 800 may include bit interleaving. At 820, coding scheme 800 may include improved codeblock concatenation to achieve equal protection of all codeblocks for transmission. In some implementations, codeblocks are concatenated sequentially for transmissions (e.g., which may apply to retransmissions as well—codeblock concatenation order may remain unchanged over retransmissions).

Figure 9:
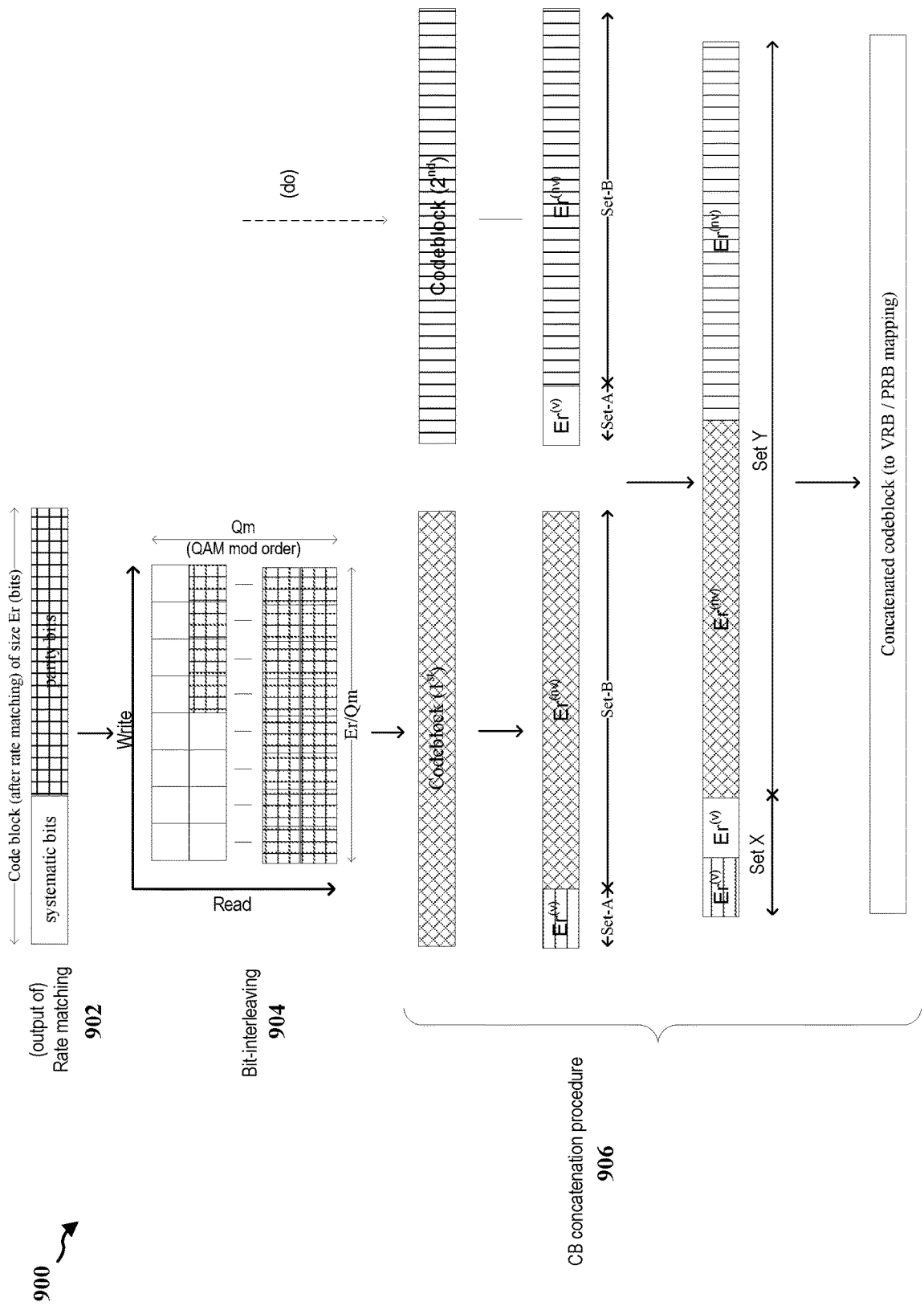
FIG. 9 is a conceptual diagram of an example codeblock concatenation scheme according to one or more implementations of the present disclosure.

In one implementation, as part of block 820, a transmitter UE may determine the encoded bits for each codeblock to be transmitted according to an encoding procedure as illustrated in FIG. 9. The transmitter UE may further determine Er(nv) and Er(v) as the number of the coded bits for each codeword that will be mapped to non-vulnerable and vulnerable REs, respectively. In some implementations, Er, which may correspond to a size of the codeblock, may be determined based on:

$Er=Er(nv)+Er(v)$

Further, Er(v) may be determined based on $Er(v)$=number of vulnerable REs*bits per modulated symbol*number of layers/number of codeblocks In one case, the number of vulnerable REs is equal to the number of REs for the first symbols in a slot. The transmitter UE may, for each codeword, extract a subset (set A) of Er(v) coded bits and a subset (set B) of Er(nv) coded bits. In one case, set A is the first Er(v) coded bits of the codeblock and set B is the last Er(nv) coded bits of the codeblock. In another case, set A is the last Er(v) coded bits of the codeblock and set B is the first Er(nv) coded bits of the codeblock. The transmitter UE may further concatenate the set-A subset of coded bits from all the codewords (equal to set X). The transmitter UE may further concatenate the set-B subset of coded bits from all the codewords (equal to set Y). The transmitter UE may further generate the concatenated codeblock by concatenating set X and set Y and mapping to the REs. In one case, the concatenated codeblock may be generated by concatenating the bits from set X first, and set Y next. In one case, the coded bits in set X may be mapped the vulnerable REs and the coded bits in set Y are mapped to the non-vulnerable REs. In one case, the coded bits in set X may be mapped to the REs on the first symbol and coded bits in set Y are mapped on the other symbols in the slot.

FIG. 9 is a conceptual diagram of a codeblock concatenation scheme 900. For example, the codeblock concatenation scheme 900 may be a graphical representation of the coding scheme 800 in FIG. 8, and notably block 820. Specifically, ensuring equal protection and/or performance of all codeblocks may be of particular importance if relying on TB level ACK/NACK. At 902, at least one codeblock may be rate matched (similar to block 816, FIG. 8). At 904, bit interleaving may be performed. At 906, the codeblock concatenation procedure may be implemented as described herein with respect to block 820, FIG. 8. Specifically, the vulnerable bits and non-vulnerable bits from at least two codeblocks are identified and grouped/concatenated into a vulnerable set X and no-vulnerable set Y. The codeblock may then be concatenated and sent to VRB and PRB mapping.

Figure 10:
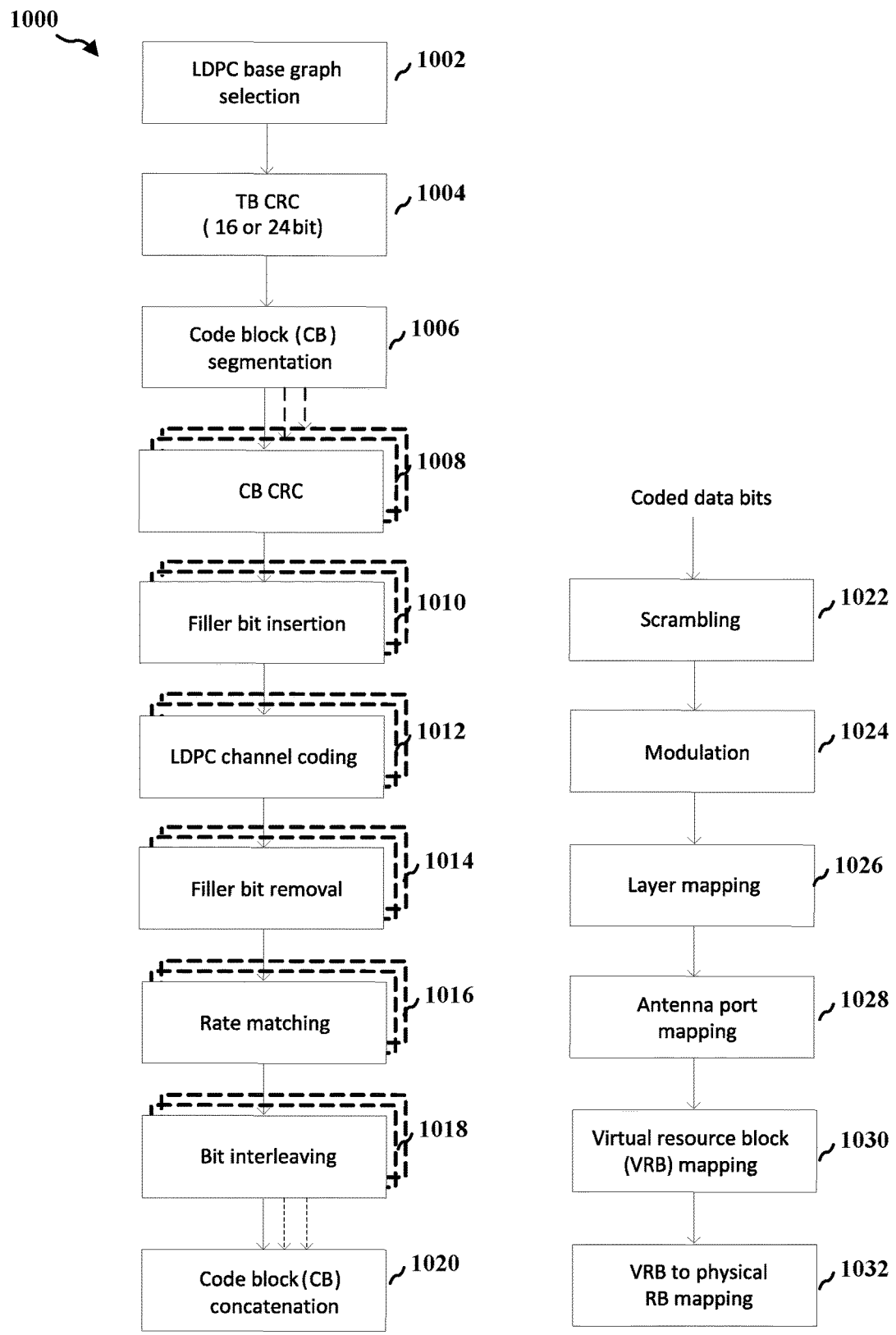
FIG. 10 is a flow diagram of an example coding, symbol modulation, and resource element mapping scheme according to one or more implementations of the present disclosure.

FIG. 10 is a flow diagram of a coding, symbol modulation, and resource element mapping scheme 1000. Blocks 1002 through 1020 may correspond to blocks 802 through 820 in FIG. 8. As the coded data bits are fed to block 1022, the bits may be scrambled according to at least one scrambling sequence. At block 1024, the codeblock may be modulated, and at block 1026, the modulated codeblock may be layer mapped. At block 1028, the resource element mapping scheme 1000 may map to one or more antenna ports. Further, at block 1030, the resource element mapping scheme 1000 may perform VRB mapping. At block 1032, the resource element mapping scheme 1000 may perform VRB to physical resource block (RB) mapping.

In some implementations, blocks 1002, 1018, 1020, and 1032, indicate the blocks for which improvements at the transmitter UE may be implemented for improved handling of vulnerable symbols. Generally, the improved handling of vulnerable symbols avoids mapping coded bits with higher importance to the vulnerable symbols. That is, the present implementations avoid mapping systematic bits to vulnerable symbols. In one implementation, for instance, at block 1002, LDPC base graph selection provides for target code rate calculation (e.g., base graph selection) to account for the pessimistic case when the vulnerable symbols are punctured at the receiver UE. In another implementation, at block 1018, bit interleaving may avoid systematic bits being present in every modulated symbol (e.g., for code rate>1/Qm) and avoid their mapping to vulnerable resource elements. In a further implementation, code block concatenation ensures equal protection across codeblocks by mapping equally to vulnerable vs. non-vulnerable symbols (REs) for each CB. In an additional implementation, at block 1032, VRB mapping avoids mapping systematic bits to vulnerable resource elements.

Figure 11:
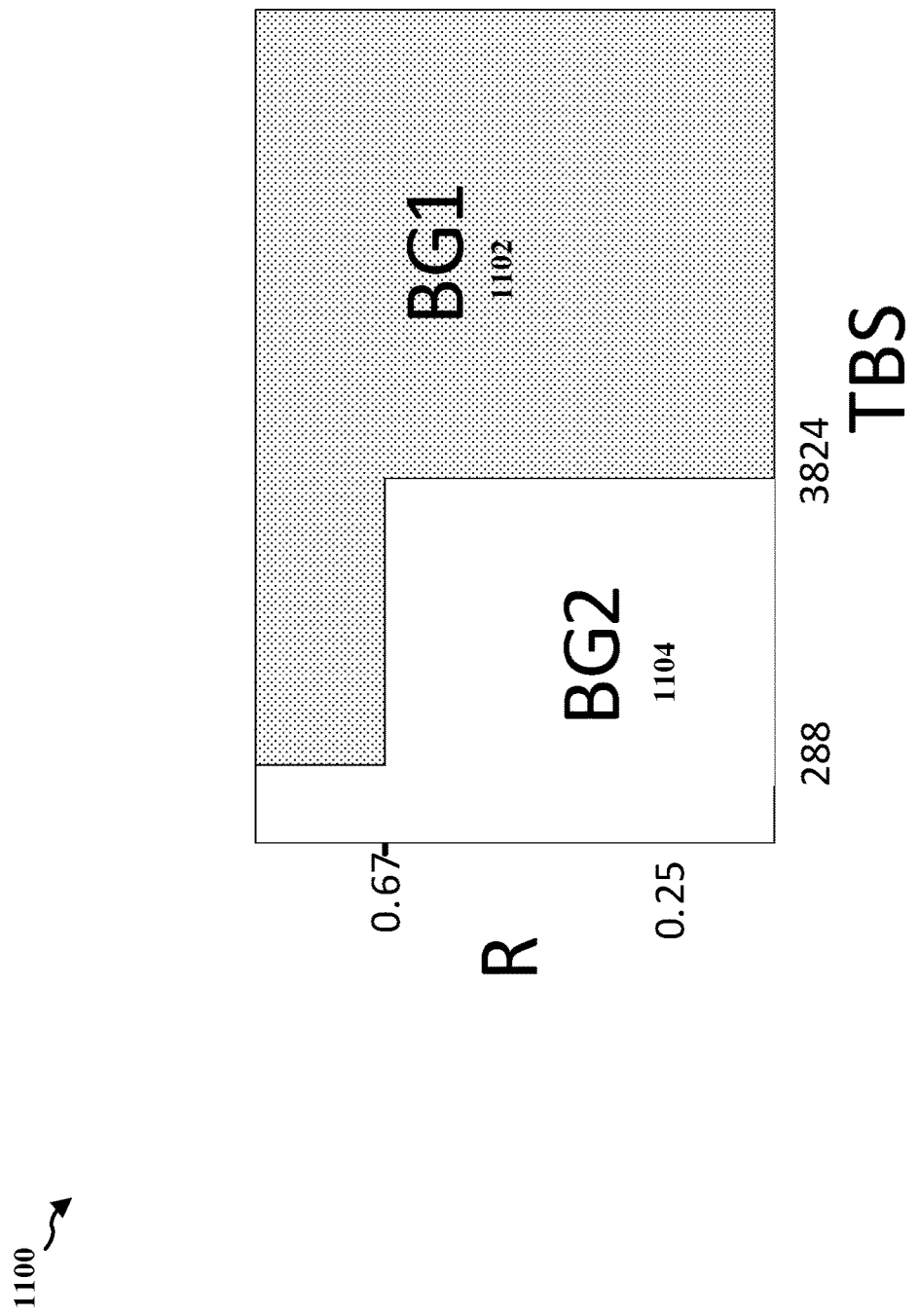
FIG. 11 is a conceptual diagram of an example combination of block lengths according to one or more implementations of the present disclosure.

FIG. 11 is a conceptual diagram 1100 of LDPC base graph selection and target rate calculation. For instance, two LDPC base-graphs may be used for data channels. Specifically, base graph 1102 may include a maximum information block length Kmax=8448, Zmax=384, kb=22, Rmin=⅓. Further, base graph 1104 may include a maximum information block length Kmax=3840, Zmax=384, kb=10, Rmin=⅕. Base graph 1102 may be used for combinations of block lengths K>308 and code rates R>⅔. Base graph 1104 may be used for block lengths K≤308 for all code rates. In some implementations, transmitter UE may determine the number of vulnerable symbols that can be potentially punctured at the receiver UE. Additionally, the transmitter UE may determine the target code rate (R) considering the pessimistic assumption that vulnerable symbols may be lost at the receiver UE, and determines the base graph to use accordingly. In some implementations, the transmitter UE determines a target code rate (R1) assuming all symbols (vulnerable and non-vulnerable) are received at receiver UE (optimistic assumption). Further, the transmitter UE may determine a target code rate (R2) assuming vulnerable symbols may be punctured at Rx UE (pessimistic assumption). Also, the transmitter UE may determine a target code rate as function of R1 and R2 for determining the base graph. In one example, the determination may be based on a traffic type (e.g., unicast vs multicast, where unicast may correspond to the pessimistic case, and multicast may correspond to the optimistic case). In another example, the function of (R1, R2) may be adapted over time based on ACK/NACK feedback.

Figure 12:
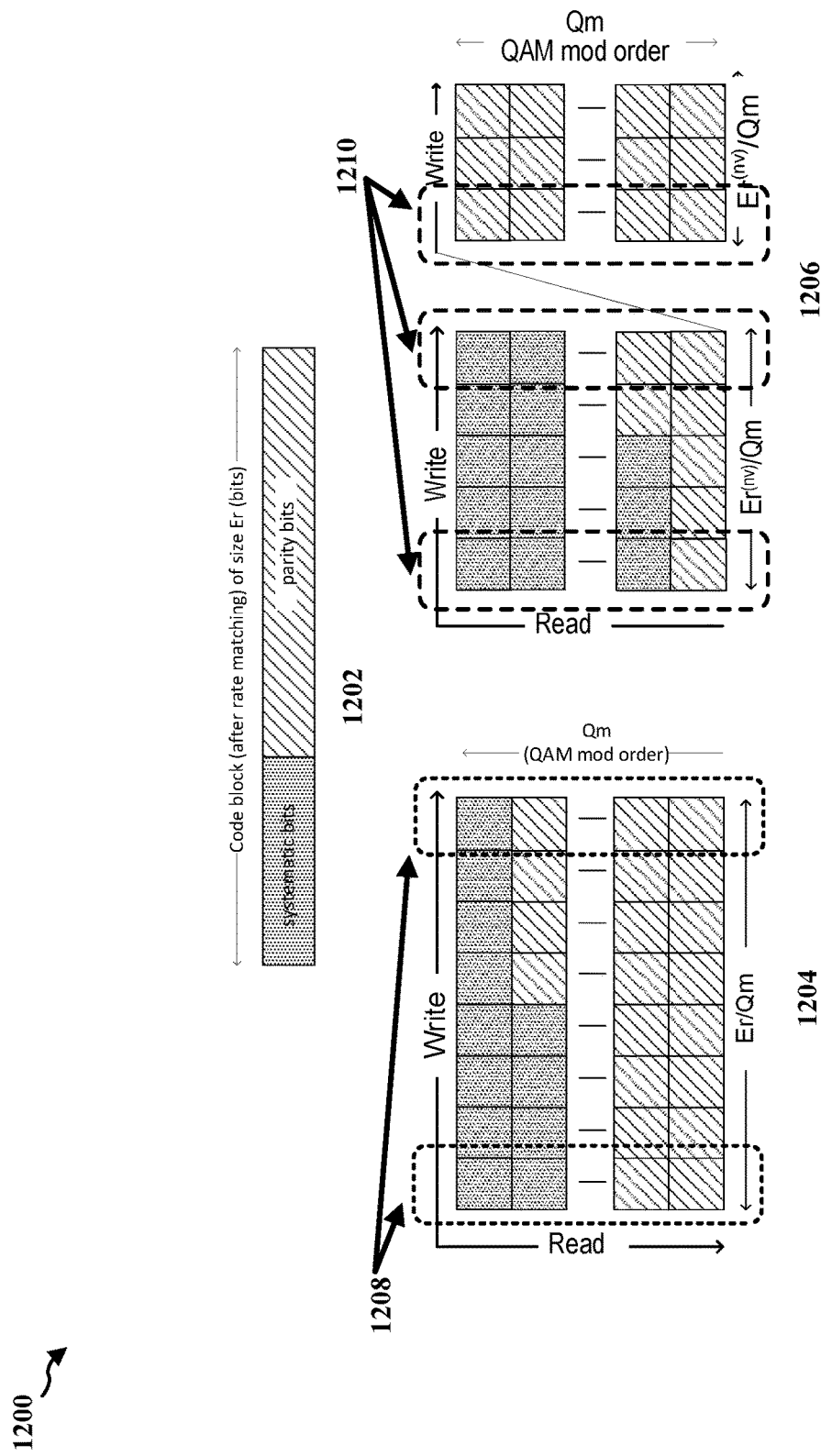
FIG. 12 is a diagram of an example of coding bit interleaving according to one or more implementations of the present disclosure.

FIG. 12 is a conceptual diagram 1200 of an example of coding bit interleaving. A bit interleaver may be applied to each codeblock after rate-matching to ensure that (e.g., for RV0) systematic bits get mapped to the most significant bit (MSB) (e.g., for higher reliability) in the QAM modulated symbols. In some implementations, the interleaving may achieve systematic bit priority ordering for RV0. For example, codeblock 1202 may correspond to a codeblock after rate matching of size Er bits. As shown, a first bit interleaving 1204 may not handle vulnerable resource elements in a manner to avoid receiver error. That is, for code rate greater than 1/Qm, all or nearly all of the modulated symbols (i.e., every resource element) may have at least one (MSB) systematic bits. As such, as shown in the interleaving of 1206, modulated symbols may be formed to correspond to non-vulnerable resource elements first, and then corresponding to vulnerable resource elements. As shown at 1208, all modulated symbols in the first bit interleaving 1204 have systematic bits. However, at 1210, the second bit interleaving 1206 includes systematic bits that are preferentially mapped to first Er(nv)/Qm modulated symbols (e.g., that are non-vulnerable) over the last Er(v)/Qm modulated symbols that may be vulnerable.

In the example shown at 1206, the code rate may be greater than 1/Qm, but less than 2/Qm. The transmitter UE may determine Er(nv) and Er(v) as the ratio of the coded bits that are non-vulnerable and vulnerable, respectively. Further, as an example, Er(nv)+Er(v)=Er (size of code block). Additionally, Er(v)=#vulnerable resource elements*bits per modulated symbol*#layers/#CBs. Further, bit interleaving may be performed such that the first Er(nv)/Qm columns are filled first (row-wise) and remaining Er(v)/Qm columns are filled later. Moreover, output bits may be read column-wise mapper starting from the first column to Er/Qm column.

Figure 13:
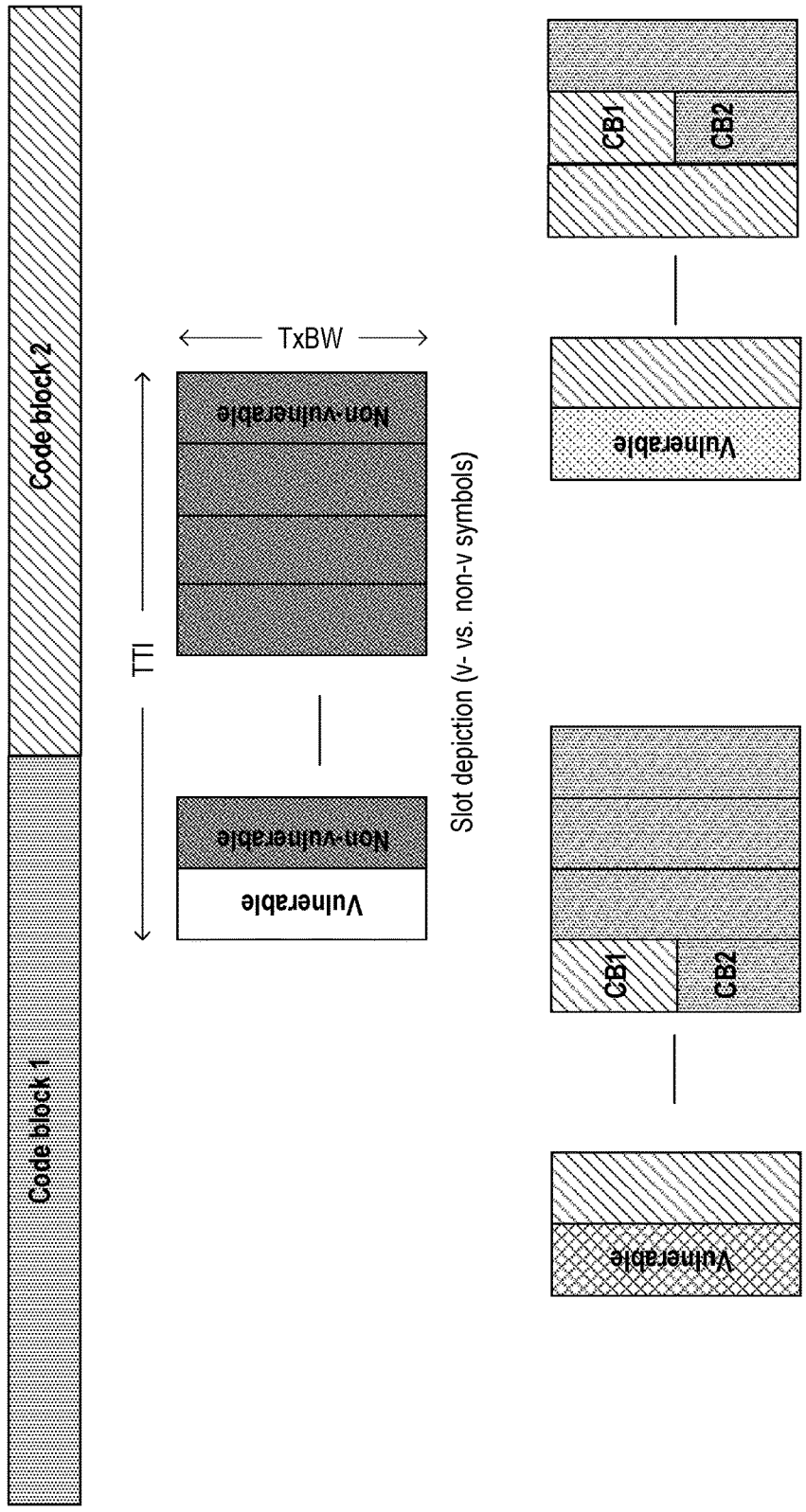
FIG. 13 is a diagram of an example code block concatenation according to one or more implementations of the present disclosure.

FIG. 13 is a diagram 1300 of an example code block concatenation. For example, the resource elements of at least two codeblocks 1302 may be concatenated according to a vulnerability condition. For more than one code block, concatenation is performed by sequentially concatenating the codeblock. Depending on the VRB mapping, the first codeword may be mapped to non-vulnerable symbols, and the second codeword may be mapped to non-vulnerable symbols in addition to the vulnerable symbols. In other words, the second codeblock may be mapped to vulnerable symbols leading to unequal protection and/or code rate of the first codeword as compared to the second codeword. For example, as shown, one slot, two codeblocks transmissions, with one vulnerable symbol may be included as part of the transmission. If mapping VRB without vulnerability protection, then only the first codeblock will get mapped to vulnerable symbols. Alternatively, the present implementations provide a VRB mapping to map to non-vulnerable symbols first, then the second codeblock may be mapped to vulnerable symbols.

Figure 14:
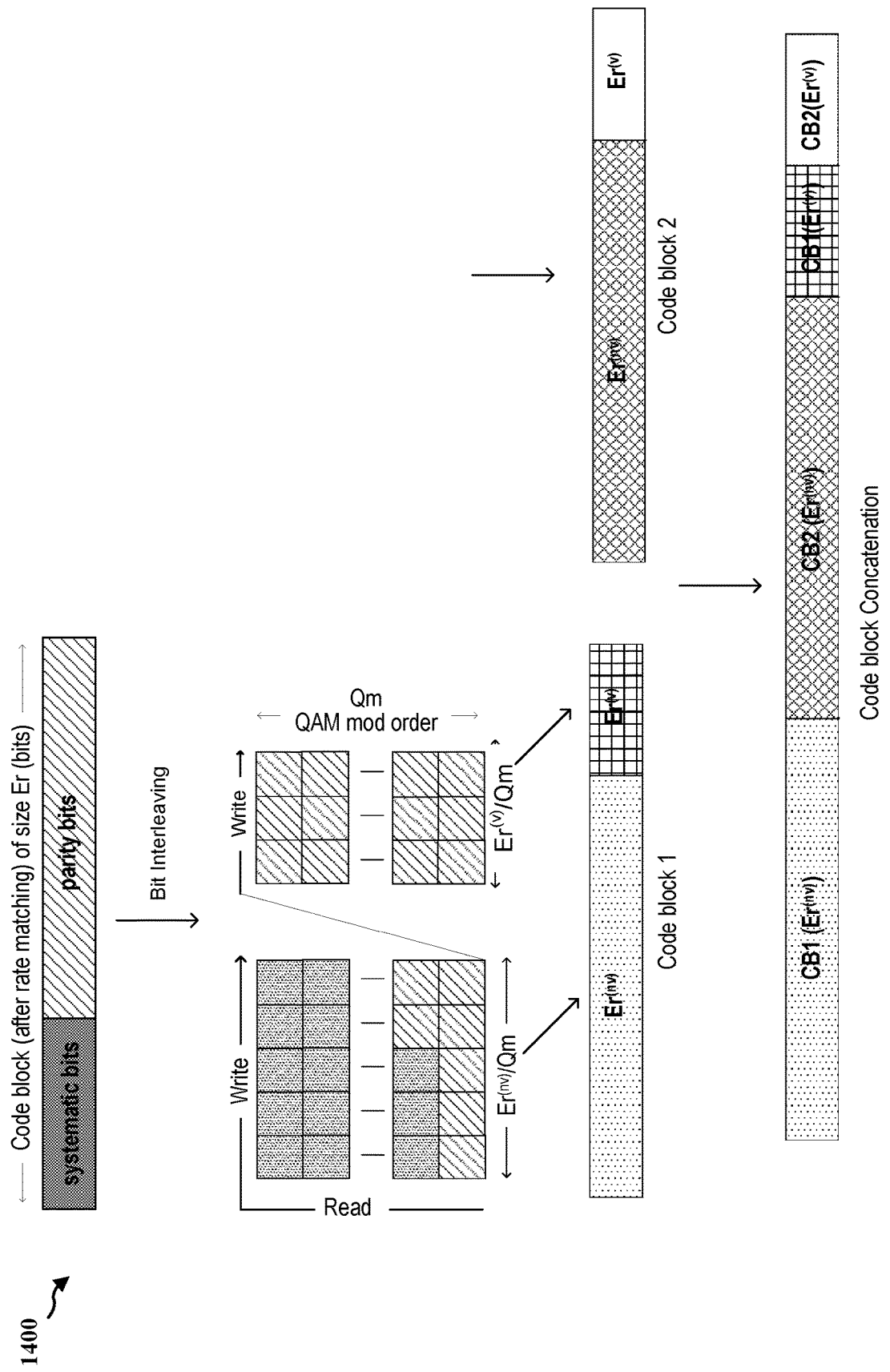
FIG. 14 is a diagram of a further example code block concatenation according to one or more implementations of the present disclosure.

FIG. 14 is a diagram 1400 of a further example code block concatenation. In some implementations, the codeblock can be concatenated. Each codeblock can be split into a non-vulnerable part and vulnerable part. The sizes of the Er(nv) and Er(v) can be the same as in bit-interleaving. The non-vulnerable part can be concatenated first across, and then codeblocks and then concatenate vulnerable part across codeblocks. Inherently this type of codeblocks concatenated with VRB mapping providing a mapping non-vulnerable symbols first, and to vulnerable symbols last.

Similar to codeblock concatenation, the resources may be mapped to non-vulnerable symbols first, and vulnerable symbols last. Further, frequency first mapping within those symbols may be performed. Together with the codeblock concatenation changes, such implementation may ensure multiple codeblocks are protected equally. For multi-slot transmission, at least two options may be implemented. The first option may correspond to: [slot 1 non-vulnerable . . . slot 1 vulnerable . . . slot 2 non-vulnerable . . . slot2 vulnerable]. The first option maps slot-by-slot, starting with non-vulnerable symbols in a given slot followed by vulnerable symbols in that slot. The second option may correspond to: [slot 1 non-vulnerable . . . slot 2 non-vulnerable . . . slot 1 vulnerable . . . slot2 vulnerable]. The second option maps to non-vulnerable symbols across aggregated slots first, and vulnerable slots across the aggregated slots last.

Figure 15:
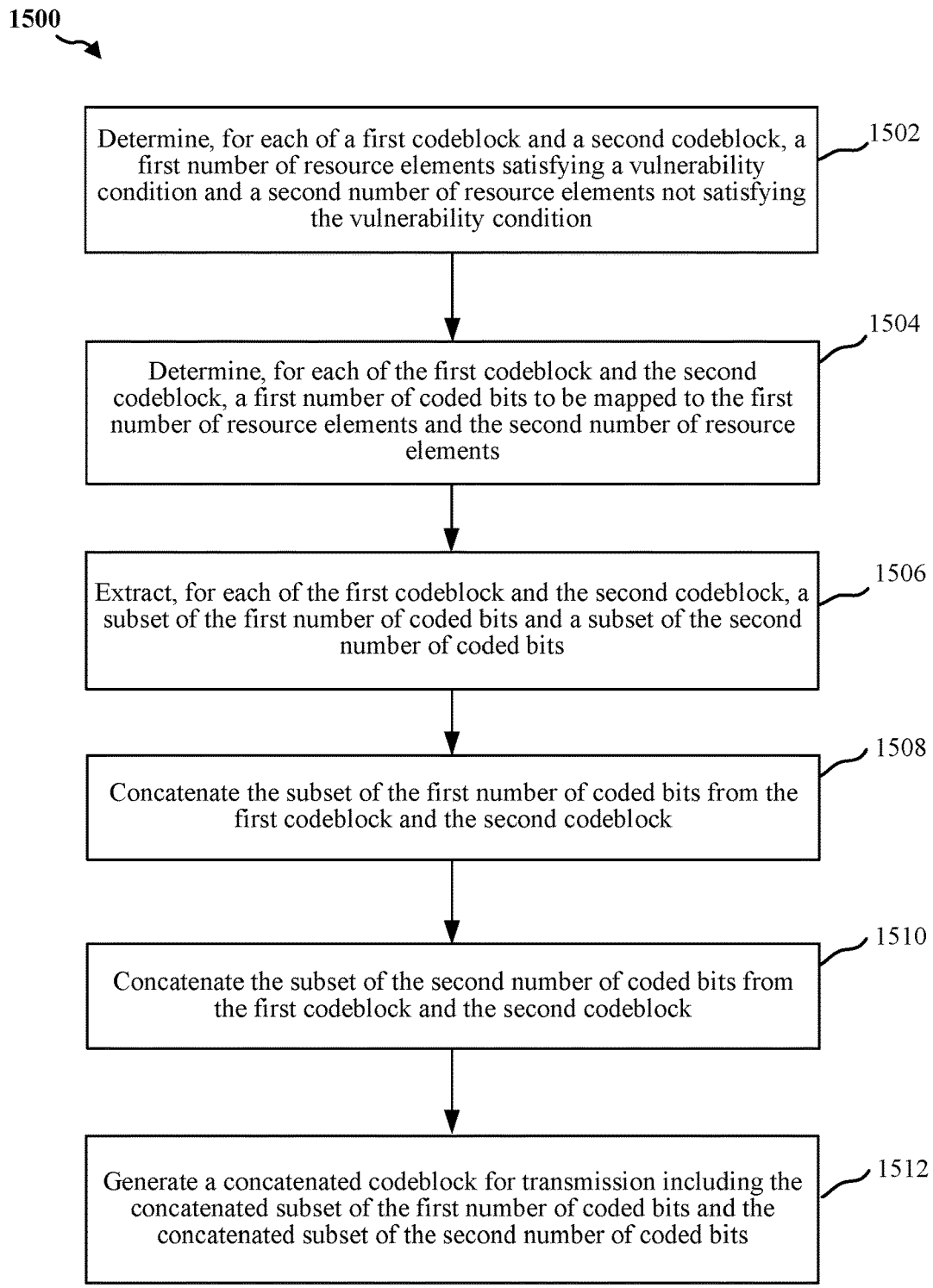
FIG. 15 is a flowchart of an example method of wireless communication for a transmitting device.

FIG. 15 is a flowchart of a method 1500 of wireless communication. The method may 1500 be performed by a transmitting device (e.g., the UE 104a including a codeblock concatenation component 198, transmitting device 402, 502, the apparatus 902/902'). The method may provide equal codeblock protection of vulnerable symbols.

At block 1502, the transmitting device 104a, via the codeblock concatenation component 198, may determine, for each of a first codeblock and a second codeblock, a first number of resource elements satisfying a vulnerability condition and a second number of resource elements not satisfying the vulnerability condition.

In some implementations, the concatenated codeblock may include the concatenated subset of the first number of resource elements in a position prior to the concatenated subset of the second number of resource elements. In some implementations, the satisfaction of the vulnerability condition indicates a potential puncturing of one or more resource elements at a receiver, the vulnerability condition corresponding to at least one of an automatic gain control retraining, a transmission/reception retuning, or a half duplex constraint.

At block 1504, via the codeblock concatenation component 198, the transmitting device 104a may determine, for each of the first codeblock and the second codeblock, a first number of coded bits to be mapped to the first number of resource elements and the second number of resource elements.

At block 1506, via the codeblock concatenation component 198, the transmitting device 104a may extract, for each of the first codeblock and the second codeblock, a subset of the first number of coded bits and a subset of the second number of coded bits.

At block 1508, via the codeblock concatenation component 198, the transmitting device 104a may concatenate the subset of the first number of coded bits from the first codeblock and the second codeblock.

At block 1510, via the codeblock concatenation component 198, the transmitting device 104a may concatenate the subset of the second number of coded bits from the first codeblock and the second codeblock.

At block 1510, via the codeblock concatenation component 198, the transmitting device 104a may generate a concatenated codeblock for transmission including the concatenated subset of the first number of coded bits and the concatenated subset of the second number of coded bits.

In some implementations, although not shown, the method 1500 may include determining a target code rate based at least on one of the first number of resource elements satisfying the vulnerability condition or the second number of resource elements not satisfying the vulnerability condition, and selecting a base graph from a set of base graphs each having a distinct maximum information block length based on the target code rate.

In some implementations, the base graph corresponds to a low density parity check (LDPC) base graph.

In some implementations, although not shown, the method 1500 may include applying a bit interleaver to the first codeblock and the second codeblock to initially map bits to the second number of resource elements prior to the first number of resource elements.

In some implementations, wherein the bits include systematic bits and parity bits, and wherein the systematic bits are mapped to the second number of resource elements prior to the first number of resource elements.

In some implementations, wherein the concatenated codeblock includes the concatenated subset of the second number of resource elements prior to the concatenated subset of the first number of resource elements.

In some implementations, wherein the concatenated codeblock sequentially includes the second number of resource elements of the first codeblock, the second number of resource elements of the second codeblock, the first number of resource elements of the first codeblock, and the first number of resource elements of the second codeblock.

In some implementations, although not shown, the method 1500 may include performing virtual resource block (VRB) mapping based on the first number of resource elements and the second number of resource elements for the first codeblock and the second codeblock.

In some implementations, wherein performing VRB mapping includes mapping, slot-by-slot from the first codeblock and the second codeblock, the second number of resource elements prior to the first number of resource elements.

In some implementations, wherein performing VRB mapping includes mapping, for the first codeblock and the second codeblock, to the second number of resource elements across aggregated slots prior to across the aggregated slots of the second number of resource elements.

Figure 16:
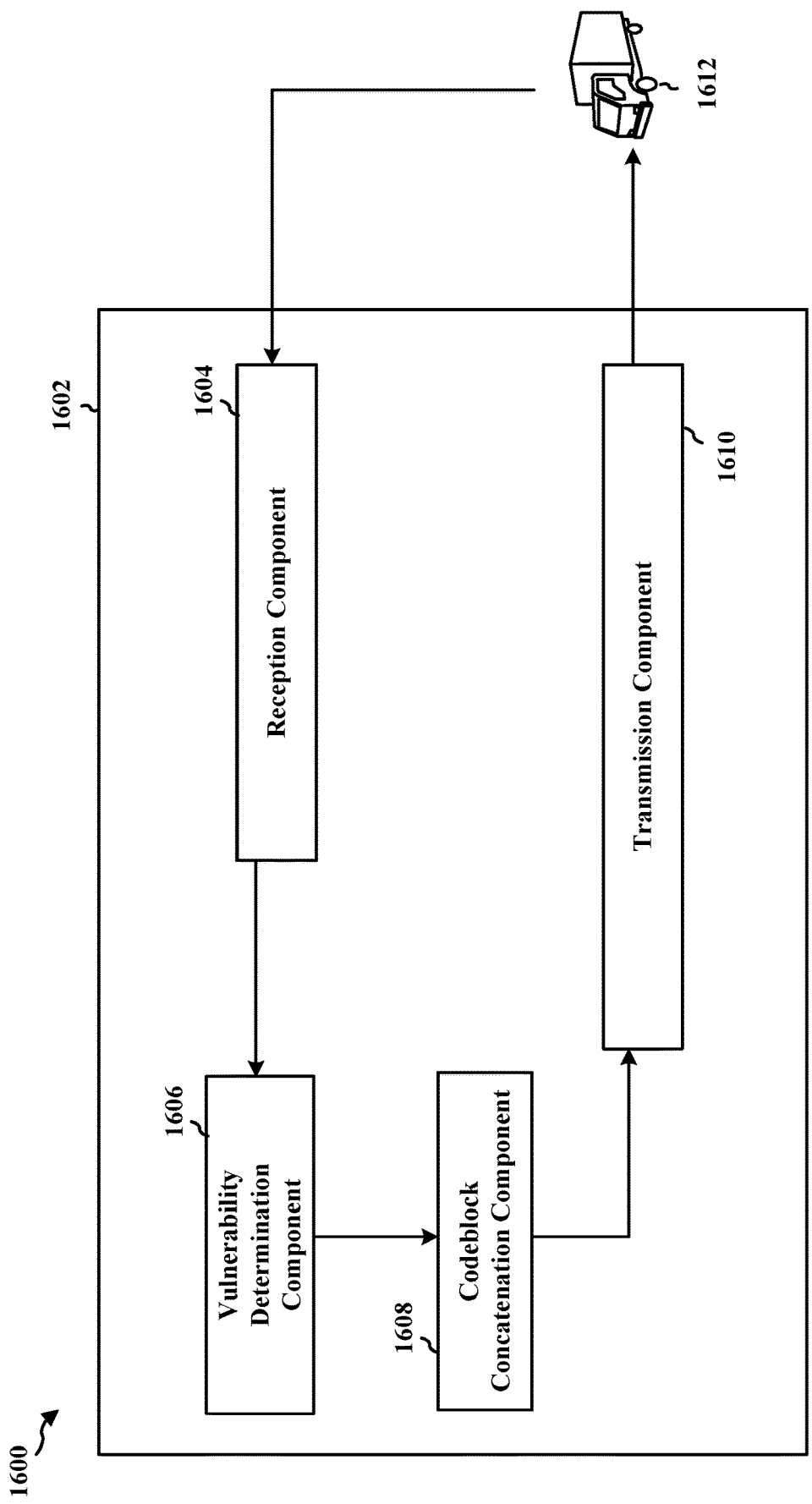
FIG. 16 is a conceptual data flow diagram illustrating the data flow between different means/components in an example apparatus for a transmitting device.

FIG. 16 is a conceptual data flow diagram 1600 illustrating the data flow between different means/components in an example apparatus 1602. The apparatus 1602 may be a transmitting device, e.g., UE 104a. The apparatus 1602 includes a reception component 1604 that receives transmissions from the UE 1612, a vulnerability determination component 1606 that determines, for each of the first codeblock and the second codeblock, a first number of coded bits to be mapped to the first number of resource elements and the second number of resource elements, extract, for each of the first codeblock and the second codeblock, a subset of the first number of resource elements and a subset of the second number of resource elements, concatenates the subset of the first number of resource elements from the first codeblock and the second codeblock, concatenating the subset of the second number of resource elements from the first codeblock and the second codeblock, and generate a concatenated codeblock for transmission including the concatenated subset of the first number of resource elements and the concatenated subset of the second number of resource elements.

The apparatus 1602 may include additional components that perform each of the blocks of the algorithm in the aforementioned flowchart of FIG. 16, and/or aspects described in connection with FIGS. 4-15. As such, each block in the aforementioned flowchart of FIG. 15 and/or aspects described in connection with FIGS. 4-14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
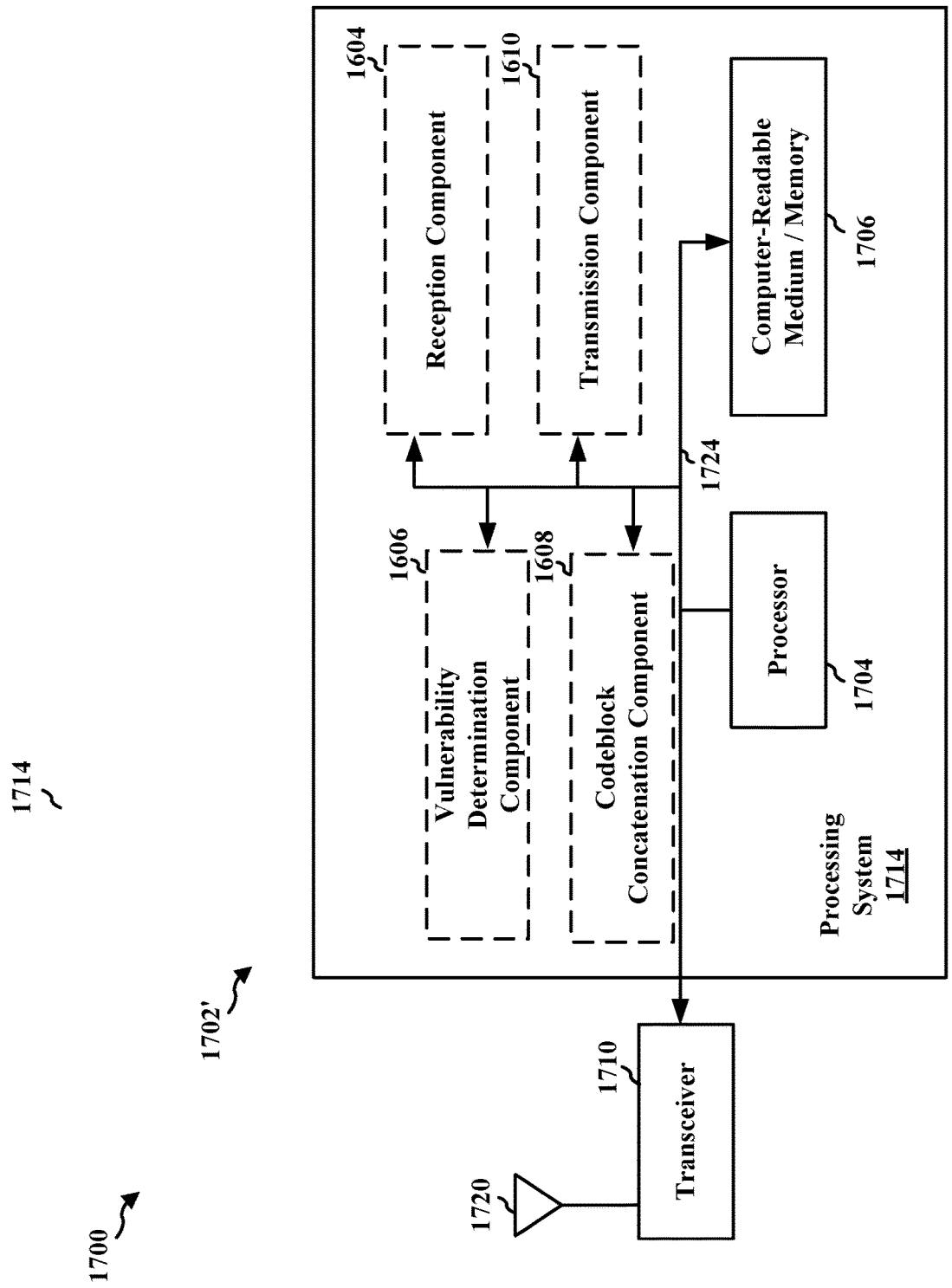
FIG. 17 is a diagram illustrating an example of a hardware implementation for an apparatus employing a processing system for a transmitting device.

FIG. 17 is a diagram 1700 illustrating an example of a hardware implementation for an apparatus 1702' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, 1610, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1704. In addition, the transceiver 1710 receives information from the processing system 1014, specifically the transmission component 1710, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1004, causes the processing system 1714 to perform the various functions described supra for any particular apparatus. The computer-readable medium/memory 1706 may also be used for storing data that is manipulated by the processor 1704 when executing software. The processing system 1714 further includes at least one of the components 1604, 1606, 1608, and 1610. The components may be software components running in the processor 1704, resident/stored in the computer readable medium/memory 1706, one or more hardware components coupled to the processor 1704, or some combination thereof. The processing system 1714 may be a component of the first transmitting device 310 or the second transmitting device 350 and may include the memory 376, 360 and/or at least one of the TX processor 316, 368, the RX processor 370, 356, and the controller/processor 375, 359.

In one configuration, the apparatus 1702/1702' for wireless communication includes means for configuring, via a control channel, acknowledgment resources for member receiving devices of a group; means for transmitting a group cast message to the member receiving devices of the group; and means for repeating the transmission of the group cast message until an acknowledgment is received from each member of the group or a number of transmissions of the group cast message reaches a maximum number of transmissions. The apparatus 1702/1702' may also include means for counting a number of received acknowledgments. The aforementioned means may be one or more of the aforementioned components of the apparatus 1702 and/or the processing system 1714 of the apparatus 1702' configured to perform the functions recited by the aforementioned means. As described supra, the processing system 1714 may include the TX processor 316, 368, the RX processor 370, 356, and the controller/processor 375, 359. As such, in one configuration, the aforementioned means may be the TX processor 316, 368, the RX processor 370, 356, and the controller/processor 375, 359 configured to perform the functions recited by the aforementioned means.

Some Further Example Implementations

An example method of wireless communications, comprising: determining, for each of a first codeblock and a second codeblock, a first number of resource elements satisfying a vulnerability condition and a second number of resource elements not satisfying the vulnerability condition; determining, for each of the first codeblock and the second codeblock, a first number of coded bits to be mapped to the first number of resource elements and the second number of resource elements; extracting, for each of the first codeblock and the second codeblock, a subset of the first number of resource elements and a subset of the second number of resource elements; concatenating the subset of the first number of resource elements from the first codeblock and the second codeblock; concatenating the subset of the second number of resource elements from the first codeblock and the second codeblock; generating a concatenated codeblock for transmission including the concatenated subset of the first number of resource elements and the concatenated subset of the second number of resource elements.

The above example method, wherein the concatenated codeblock includes the concatenated subset of the first number of resource elements in a position prior to the concatenated subset of the second number of resource elements.

One or more of the above example methods, wherein satisfaction of the vulnerability condition indicates a potential puncturing of one or more resource elements at a receiver, the vulnerability condition corresponding to at least one of: an automatic gain control retraining, a transmission/reception retuning, or a half duplex constraint.

One or more of the above example methods, further comprising: determining a target code rate based at least on one of the first number of resource elements satisfying the vulnerability condition or the second number of resource elements not satisfying the vulnerability condition; and selecting a base graph from a set of base graphs each having a distinct maximum information block length based on the target code rate.

One or more of the above example methods, wherein the base graph corresponds to a low density parity check (LDPC) base graph.

One or more of the above example methods, further comprising applying a bit interleaver to the first codeblock and the second codeblock to initially map bits to the second number of resource elements prior to the first number of resource elements.

One or more of the above example methods, wherein the bits include systematic bits and parity bits, and wherein the systematic bits are mapped to the second number of resource elements prior to the first number of resource elements.

One or more of the above example methods, wherein the concatenated codeblock includes the concatenated subset of the second number of resource elements prior to the concatenated subset of the first number of resource elements.

One or more of the above example methods, wherein the concatenated codeblock sequentially includes the second number of resource elements of the first codeblock, the second number of resource elements of the second codeblock, the first number of resource elements of the first codeblock, and the first number of resource elements of the second codeblock.

One or more of the above example methods, further comprising performing virtual resource block (VRB) mapping based on the first number of resource elements and the second number of resource elements for the first codeblock and the second codeblock.

One or more of the above example methods, performing VRB mapping includes mapping, slot-by-slot from the first codeblock and the second codeblock, the second number of resource elements prior to the first number of resource elements One or more of the above example methods, wherein performing VRB mapping includes mapping, for the first codeblock and the second codeblock, to the second number of resource elements across aggregated slots prior to across the aggregated slots of the second number of resource elements An example apparatus for wireless communication, comprising: means for determining, for each of a first codeblock and a second codeblock, a first number of resource elements satisfying a vulnerability condition and a second number of resource elements not satisfying the vulnerability condition; means for determining, for each of the first codeblock and the second codeblock, a first number of coded bits to be mapped to the first number of resource elements and the second number of resource elements; means for extracting, for each of the first codeblock and the second codeblock, a subset of the first number of resource elements and a subset of the second number of resource elements; means for concatenating the subset of the first number of resource elements from the first codeblock and the second codeblock; means for concatenating the subset of the second number of resource elements from the first codeblock and the second codeblock; means for generating a concatenated codeblock for transmission including the concatenated subset of the first number of resource elements and the concatenated subset of the second number of resource elements.

An example apparatus for wireless communication, comprising: a memory; and at least one processor coupled to the memory and configured to: determine, for each of a first codeblock and a second codeblock, a first number of resource elements satisfying a vulnerability condition and a second number of resource elements not satisfying the vulnerability condition; determine, for each of the first codeblock and the second codeblock, a first number of coded bits to be mapped to the first number of resource elements and the second number of resource elements; extract, for each of the first codeblock and the second codeblock, a subset of the first number of resource elements and a subset of the second number of resource elements; concatenate the subset of the first number of resource elements from the first codeblock and the second codeblock; concatenate the subset of the second number of resource elements from the first codeblock and the second codeblock; generate a concatenated codeblock for transmission including the concatenated subset of the first number of resource elements and the concatenated subset of the second number of resource elements.

An example computer-readable medium storing computer executable code, the code when executed by a processor cause the processor to: determine, for each of a first codeblock and a second codeblock, a first number of resource elements satisfying a vulnerability condition and a second number of resource elements not satisfying the vulnerability condition; determine, for each of the first codeblock and the second codeblock, a first number of coded bits to be mapped to the first number of resource elements and the second number of resource elements; extract, for each of the first codeblock and the second codeblock, a subset of the first number of resource elements and a subset of the second number of resource elements; concatenate the subset of the first number of resource elements from the first codeblock and the second codeblock; concatenate the subset of the second number of resource elements from the first codeblock and the second codeblock; generate a concatenated codeblock for transmission including the concatenated subset of the first number of resource elements and the concatenated subset of the second number of resource elements.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communications, comprising:
   determining, for each of a first codeblock and a second codeblock, a first number of resource elements satisfying a vulnerability condition and a second number of resource elements not satisfying the vulnerability condition;
   determining, for each of the first codeblock and the second codeblock, a first number of coded bits to be mapped to the first number of resource elements and the second number of resource elements;
   extracting, for each of the first codeblock and the second codeblock, a subset of the first number of coded bits and a subset of the second number of coded bits;
   concatenating the subset of the first number of coded bits from the first codeblock and the second codeblock;
   concatenating the subset of the second number of coded bits from the first codeblock and the second codeblock; and
   generating a concatenated codeblock for transmission including the concatenated subset of the first number of coded bits and the concatenated subset of the second number of coded bits.

2. The method of claim 1, wherein the concatenated codeblock includes the concatenated subset of the first number of coded bits in a position prior to the concatenated subset of the second number of coded bits.

3. The method of claim 1, wherein satisfaction of the vulnerability condition indicates a potential puncturing of one or more resource elements at a receiver, the vulnerability condition corresponding to at least one of:
   an automatic gain control retraining,
   a transmission/reception retuning, or
   a half duplex constraint.

4. The method of claim 1, the method further comprising:
   determining a target code rate based at least on one of the first number of resource elements satisfying the vulnerability condition or the second number of resource elements not satisfying the vulnerability condition; and
   selecting a base graph from a set of base graphs each having a distinct maximum information block length based on the target code rate.

5. The method of claim 4, wherein the base graph corresponds to a low density parity check (LDPC) base graph.

6. The method of claim 1, further comprising applying a bit interleaver to the first codeblock and the second codeblock to initially map bits to the second number of resource elements prior to the first number of resource elements.

7. The method of claim 6, wherein the bits include systematic bits and parity bits, and wherein the systematic bits are mapped to the second number of resource elements prior to the first number of resource elements.

8. The method of claim 1, wherein the concatenated codeblock includes the concatenated subset of the second number of coded bits prior to the concatenated subset of the first number of coded bits.

9. The method of claim 8, wherein the concatenated codeblock sequentially includes the second number of coded bits of the first codeblock, the second number of coded bits of the second codeblock, the first number of coded bits of the first codeblock, and the first number of coded bits of the second codeblock.

10. The method of claim 1, further comprising performing virtual resource block (VRB) mapping of the concatenated codeblock to the first number of resource elements and the second number of resource elements for the first codeblock and the second codeblock.

11. The method of claim 1, wherein performing VRB mapping includes mapping, slot-by-slot from the first codeblock and the second codeblock, the second number of coded bits prior to the first number of coded bits.

12. The method of claim 1, wherein performing VRB mapping includes mapping, for the first codeblock and the second codeblock, to the second number of resource elements across aggregated slots prior to across the aggregated slots of the second number of resource elements.

13. An apparatus for wireless communication, comprising:
a memory; and
at least one processor coupled to the memory and configured to:
determine, for each of a first codeblock and a second codeblock, a first number of resource elements satisfying a vulnerability condition and a second number of resource elements not satisfying the vulnerability condition;
determine, for each of the first codeblock and the second codeblock, a first number of coded bits to be mapped to the first number of resource elements and the second number of resource elements;
extract, for each of the first codeblock and the second codeblock, a subset of the first number of coded bits and a subset of the second number of coded bits;
concatenate the subset of the first number of coded bits from the first codeblock and the second codeblock;
concatenate the subset of the second number of coded bits from the first codeblock and the second codeblock; and
generate a concatenated codeblock for transmission including the concatenated subset of the first number of coded bits and the concatenated subset of the second number of coded bits.

14. The apparatus of claim 13, wherein the concatenated codeblock includes the concatenated subset of the first number of coded bits in a position prior to the concatenated subset of the second number of coded bits.

15. The apparatus of claim 13, wherein satisfaction of the vulnerability condition indicates a potential puncturing of one or more resource elements at a receiver, the vulnerability condition corresponding to at least one of:
an automatic gain control retraining,
a transmission/reception retuning, or
a half duplex constraint.

16. The apparatus of claim 13, wherein the at least one processor is further configured to:
determine a target code rate based at least on one of the first number of resource elements satisfying the vulnerability condition or the second number of resource elements not satisfying the vulnerability condition; and
select a base graph from a set of base graphs each having a distinct maximum information block length based on the target code rate.

17. The apparatus of claim 16, wherein the base graph corresponds to a low density parity check (LDPC) base graph.

18. The apparatus of claim 13, wherein the at least one processor is further configured to apply a bit interleaver to the first codeblock and the second codeblock to initially map bits to the second number of resource elements prior to the first number of resource elements.

19. The apparatus of claim 18, wherein the bits include systematic bits and parity bits, and wherein the systematic bits are mapped to the second number of resource elements prior to the first number of resource elements.

20. The apparatus of claim 13, wherein the concatenated codeblock includes the concatenated subset of the second number of coded bits prior to the concatenated subset of the first number of coded bits.

21. The apparatus of claim 20, wherein the concatenated codeblock sequentially includes the second number of coded bits of the first codeblock, the second number of coded bits of the second codeblock, the first number of coded bits of the first codeblock, and the first number of coded bits of the second codeblock.

22. The apparatus of claim 13, wherein the at least one processor is further configured to perform virtual resource block (VRB) mapping of the concatenated codeblock to the first number of resource elements and the second number of resource elements for the first codeblock and the second codeblock.

23. The apparatus of claim 13, wherein to perform the VRB mapping, the at least one processor is further configured to map, slot-by-slot from the first codeblock and the second codeblock, the second number of coded bits prior to the first number of coded bits.

24. The apparatus of claim 13, wherein to perform the VRB mapping, the at least one processor is further configured to map, for the first codeblock and the second codeblock, to the second number of resource elements across aggregated slots prior to across the aggregated slots of the second number of resource elements.

25. A non-transitory computer-readable medium storing computer executable code, the code when executed by a processor cause the processor to:
determine, for each of a first codeblock and a second codeblock, a first number of resource elements satisfying a vulnerability condition and a second number of resource elements not satisfying the vulnerability condition;
determine, for each of the first codeblock and the second codeblock, a first number of coded bits to be mapped to the first number of resource elements and the second number of resource elements;
extract, for each of the first codeblock and the second codeblock, a subset of the first number of coded bits and a subset of the second number of coded bits;
concatenate the subset of the first number of coded bits from the first codeblock and the second codeblock;

concatenate the subset of the second number of coded bits from the first codeblock and the second codeblock; and generate a concatenated codeblock for transmission including the concatenated subset of the first number of coded bits and the concatenated subset of the second number of coded bits.

26. The non-transitory computer-readable medium of claim 25, wherein the concatenated codeblock includes the concatenated subset of the first number of coded bits in a position prior to the concatenated subset of the second number of coded bits.

27. The non-transitory computer-readable medium of claim 25, wherein satisfaction of the vulnerability condition indicates a potential puncturing of one or more resource elements at a receiver, the vulnerability condition corresponding to at least one of:

an automatic gain control retraining, a transmission/reception retuning, or a half duplex constraint.

28. An apparatus for wireless communication, comprising:

means for determining, for each of a first codeblock and a second codeblock, a first number of resource elements satisfying a vulnerability condition and a second number of resource elements not satisfying the vulnerability condition;

means for determining, for each of the first codeblock and the second codeblock, a first number of coded bits to be mapped to the first number of resource elements and the second number of resource elements;

means for extracting, for each of the first codeblock and the second codeblock, a subset of the first number of coded bits and a subset of the second number of coded bits;

means for concatenating the subset of the first number of coded bits from the first codeblock and the second codeblock;

means for concatenating the subset of the second number of coded bits from the first codeblock and the second codeblock; and means for generating a concatenated codeblock for transmission including the concatenated subset of the first number of coded bits and the concatenated subset of the second number of coded bits.

29. The apparatus of claim 28, wherein the concatenated codeblock includes the concatenated subset of the first number of coded bits in a position prior to the concatenated subset of the second number of coded bits.

30. The apparatus of claim 28, wherein satisfaction of the vulnerability condition indicates a potential puncturing of one or more resource elements at a receiver, the vulnerability condition corresponding to at least one of:

an automatic gain control retraining, a transmission/reception retuning, or a half duplex constraint.

* * * * *